(12) United States Patent
Yokohata et al.

(10) Patent No.: US 7,774,572 B2
(45) Date of Patent: Aug. 10, 2010

(54) MIGRATING DATA IN A DISTRIBUTED STORAGE SYSTEM BASED ON STORAGE CAPACITY UTILIZATION

(75) Inventors: Toru Yokohata, Kawasaki (JP); Atsuo Iida, Kawasaki (JP); Arata Ejiri, Kawasaki (JP); Mitsuhiko Ohta, Kawasaki (JP); Riichiro Take, Kawasaki (JP); Kazutaka Ogihara, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 10/880,241

(22) Filed: Jun. 29, 2004

(65) Prior Publication Data
US 2005/0015547 A1 Jan. 20, 2005

(30) Foreign Application Priority Data
Jul. 14, 2003 (JP) ............................. 2003-274307
Apr. 12, 2004 (JP) ............................. 2004-116553

(51) Int. Cl.
*G06F 12/00* (2006.01)
*G06F 13/00* (2006.01)
*G06F 13/28* (2006.01)

(52) U.S. Cl. ............................................. 711/171
(58) Field of Classification Search ............. 711/114
See application file for complete search history.

(56) References Cited

U.S. PATENT DOCUMENTS

| | | | | |
|---|---|---|---|---|
| 5,018,060 | A | * | 5/1991 | Gelb et al. ................... 707/205 |
| 5,193,171 | A | * | 3/1993 | Shinmura et al. ............ 711/113 |
| 5,619,690 | A | | 4/1997 | Matsumani et al. |
| 5,675,789 | A | * | 10/1997 | Ishii et al. ................... 707/204 |
| 5,956,750 | A | | 9/1999 | Yamamoto et al. |
| 6,101,558 | A | | 8/2000 | Utsunomiya et al. |
| 6,332,204 | B1 | * | 12/2001 | Russell ...................... 714/710 |

(Continued)

FOREIGN PATENT DOCUMENTS

JP 5-151035 6/1993

(Continued)

OTHER PUBLICATIONS

Y. Kawamura et al., "System Operation Management Supporting Progress in IT Systems," The Hitachi Hyoron, Extra Issue, Sep. 2002. (Partial Translation).

*Primary Examiner*—Brian R Peugh
*Assistant Examiner*—Gary W Cygiel
(74) *Attorney, Agent, or Firm*—Greer, Burns & Crain, Ltd.

(57) ABSTRACT

The present invention relates to a system capable of carrying out efficient and stable system operation control even if a usage rate of the entire system varies under a situation in which the characteristics of storage units, such as maximum available total capacity and speed performance, are largely different from each other. Therefore, the system according to the present invention is composed of a monitor unit for monitoring information on a total volume of data stored in each of the storage units or in all the storage units, an index value calculating unit for calculating an index value on the basis of the monitor result and a location unit for distributively locating or relocating logical storage areas in physical storage areas on a plurality of storage units on the basis of the calculated index value.

24 Claims, 12 Drawing Sheets

U.S. PATENT DOCUMENTS

| | | |
|---|---|---|
| 6,347,343 B1 | 2/2002 | Utsunomiya et al. |
| 6,487,634 B1 * | 11/2002 | Bachmat ..................... 711/112 |
| 6,691,177 B2 | 2/2004 | Utsunomiya et al. |
| 6,711,656 B2 | 3/2004 | Nishio et al. |
| 6,766,416 B2 * | 7/2004 | Bachmat ..................... 711/114 |
| 6,920,153 B2 * | 7/2005 | Ellis et al. ................... 370/475 |
| 7,092,975 B2 * | 8/2006 | Bradley et al. ............... 707/204 |
| 2002/0073248 A1 | 6/2002 | Utsunomiya et al. |
| 2003/0014604 A1 | 1/2003 | Nishio et al. |
| 2004/0103259 A1 | 5/2004 | Nishio et al. |
| 2005/0033749 A1 * | 2/2005 | M'Zoughi et al. ........... 707/100 |

FOREIGN PATENT DOCUMENTS

| | | |
|---|---|---|
| JP | 7-73090 | 3/1995 |
| JP | 9-223047 | 8/1997 |
| JP | 9-274544 | 10/1997 |
| JP | 2766424 | 4/1998 |
| JP | 11-15720 | 1/1999 |
| JP | 2924167 | 5/1999 |
| JP | 2001-67187 | 3/2001 |
| JP | 2002-157091 | 5/2002 |
| JP | 2003-30013 | 1/2003 |
| JP | 2003-131909 | 5/2003 |
| JP | 2003-140836 | 5/2003 |
| JP | 2003-223342 | 8/2003 |
| WO | WO 03/054735 A1 * | 7/2003 |

* cited by examiner

MIGRATING DATA IN A DISTRIBUTED STORAGE SYSTEM BASED ON STORAGE CAPACITY UTILIZATION

BACKGROUND OF THE INVENTION

1) Field of the Invention

The present invention relates to a technique applicable to a large-scale distributed storage system including a plurality of storage units, and more particularly to a technique capable of generalizing a plurality of storage units having diverse characteristics, such as large, medium and small scales and high, medium and low speeds, for achieving efficient and stable control of operations.

2) Description of the Related Art

For example, Japanese Patent Laid-Open No. HEI 5-334006 (Patent No. 276624) discloses, in a distributed network storage system in which a plurality of storage units are distributively disposed on a network, the utilization of a virtual storage technique called "logical volume". In such a system, the techniques for the storage control on a disk array of each of the storage units are disclosed, for example, in Japanese Patent Laid-Open Nos. HEI 9-274544, 2001-67187 and 2002-157091.

In Japanese Patent Laid-Open No. HEI 9-274544, the "index for relocation" is defined and all data are re-stored in succession after information on access to each of the logical disk units (logical volume) is collected as the index so that the relocation is made on a physical disk unit (storage unit) of the logical disk unit on the basis of the access information. This discloses the technique in which, for example, the access frequency to data is collected as the aforesaid index (access information) and a logical disk unit high in access frequency is relocated at a higher-speed physical disk unit and, of the data distributed on an array, the data high in access frequency are put together in one location to enhance the sequential access performance.

Japanese Patent Laid-Open No. 2001-67187 discloses the technique in which a plurality of storage units are classified (sorted) into a plurality of classes with attributes for the management so that a maintainer can easily determine the data transferring location and the data receiving location for the relocation on the basis of the using situation of each of the classes and the aforesaid attribute to simplify the operations for accomplishing the location optimization through the physical relocation in a storage area. In particular, Japanese Patent Laid-Open No. 2001-67187 discloses a method of determining the class on the destination in a logical storage area for the relocation so that the time of use of each storage unit (disk unit) per unit time does not exceed an upper limit value set as the aforesaid attribute on a class basis. That is, it discloses a method in which the data access concentration point on the array is detected to carry out the load distribution for apparently preventing the access performance degradation of the entire array.

For realizing the method disclosed in Japanese Patent Laid-Open No. 2001-67187, Japanese Patent Laid-Open No. 2002-157091 discloses a technique for correctly totalizing the "occupied times (service times) in a logical storage area of each physical storage unit (disk unit)" even if the cache processing is conducted in each physical storage unit. That is, as in the case of Japanese Patent Laid-Open No. 2001-67187, Japanese Patent Laid-Open No. 2002-157091 also discloses a method in which the data access concentration point on the array is detected to carry out the load distribution for apparently preventing the access performance degradation of the entire array.

Meanwhile, in the conventional techniques including the aforesaid patent documents, it is assumed that, in handling the aforesaid distributed network storage system, the characteristics of the individual physical storage units, such as the maximum available (usable) total capacity and the speed performance, are equal to each other or almost same and have magnitudes sufficient to various types of requests. As far as this assumption comes into satisfaction, in the distributed network storage system, for example, when the data access concentration point is found, this concentration point is eliminable without problems by carrying out the common working capacity equalization or residual capacity equalization (which will be mentioned later) among a plurality of physical storage units.

However, a large-scale network storage system whose further development is expectable in the future is somewhat different in situation from the system that the aforesaid assumption comes into satisfaction, for that the system extensibility can be regarded as being infinite in effect and all the maintenance operations including the system expanding operation are conducted without interrupting the system service (guaranteeing one-year, 365-days, 24-hours continuous operation).

That is, if the distributed network storage system is placed into operation under the above-mentioned situation, the maximum available total capacities of the individual physical storage units pertaining to this system do not become constant. Probably, the storage capacity of a physical storage unit to be newly added exceeds twice the storage capacity of the unit installed half year to one year ago, and it is clear that the aforesaid assumption does not come into satisfaction.

In a system composed of physical storage units having different capacities, if the common working capacity equalization or residual capacity equalization is applied, as mentioned later, the deviation in data location state occurs in a plurality of physical storage units, and if the utilization factor of the entire system is low, the response performance of the system degrades while, if the utilization factor of the entire system is high, the system stabilization performance degrades.

Therefore, it is desired to achieve the efficient and stable operation control of the system even if the utilization factor (usage rate or activity ratio) of the entire system varies under a situation that the characteristics such as the maximum available total capacity and speed performance of individual physical storage units pertaining to the system are not made uniform unlike the case of the conventional technique.

A concrete description will be given herein below of the working capacity equalization, the residual capacity equalization and a situation when these equalizations are applied to a system including diverse storage units different in capacity from each other.

In the following description, $T_i$ represents the total capacity of a storage node (physical storage unit) i, $U_i$ depicts the working capacity of the storage node i, $R_i$ denotes the residual capacity of the storage node i, and these variables $T_i$, $U_i$ and $R_i$ show the following relationship expressed by the following equations (1) and (2).

$$T_i = U_i + R_i \tag{1}$$

$$T_1 \geq T_2 \geq T_3 \geq T_4 \geq T_5 \geq T_6 \tag{2}$$

An examination/description will first be given of the working capacity equalization.

For the working capacity equalization, the total capacities $T_i$ different from each other are handled so that the working capacities $U_i$ become the same level U wherever possible. The system resource disposition, satisfies the following equations (3) and (4), becomes a common "ideal" with respect to this case, and further "improving effort" is not done.

$$U_i = \overline{U} = U \quad (3)$$

$$R_i = T_i - U \quad (4)$$

where $\overline{U}$ signifies an average (mean) value of $U_i$.

In the case of the resource disposition other than the aforesaid "ideal", the "improving effort" index value $\Delta U_i$ with respect to each node i can be defined by the following equation (5). In this case, the user data flows into node showing $\Delta U_i > 0$.

$$\Delta U_i = \overline{U} - U_i \quad (5)$$

In the case of the working capacity equalization, the data movement (equalization) is made according to $\Delta U_i$ of the equation (5).

Secondly, an examination/description will first be given of the residual capacity equalization.

For the residual capacity equalization, the total capacities $T_i$ different from each other are handled so that the residual capacities $R_i$ become the same level R wherever possible. The system resource disposition, satisfying the following equations (6) and (7), becomes a common "ideal" with respect to this case, and further "improving effort" is not done.

$$R_i = \overline{R} = R \quad (6)$$

$$U_i = T_i - R \quad (7)$$

where $\overline{R}$ signifies an average value of $R_i$.

In the case of the resource disposition other than the aforesaid "ideal", the "improving effort" index value $\Delta R_i$ with respect to each node i can be defined by the following equation (8). In this case, the user data flows into the node showing $\Delta R_i > 0$.

$$\Delta R_i = R_i - \overline{R} \quad (8)$$

From the above-mentioned equations, the following equation (9) is obtainable through simple arithmetic.

$$\Delta R_i = (\overline{U} - U_i) - (\overline{T} - T_i) \quad (9)$$

where $\overline{T}$ signifies an average value of $T_i$.

In the case of the residual capacity equalization, the data movement (equalization) is made according to $\Delta R_i$ of the equation (8) or (9).

Moreover, in a system in which the sizes $T_i$ of the nodes are identical to each other, the "working capacity equalization" and the "residual capacity equalization" based upon the identical operations.

On the other hand, if the difference between the sizes $T_i$ of the nodes reaches several times to several ten times, the following situations take place according to the usage rate (utilization factor) of the entire system.

In a case in which the usage rate of the entire system is relatively small, in the right side of the aforesaid equation (9), the absolute value of the second term is considerably larger than the absolute value of the first term. Therefore, for the "residual capacity equalization", it is seen that a new storage area is selectively secured on a large-capacity storage while almost no new storage area is secured on a small-capacity storage. That is, the data is located on only the large-capacity storage and, hence, there is a possibility that the degradation of the response performance occurs.

In addition, in a case in which the usage rate of the entire system is relatively large (that is, when the capacity is tight), since the size $T_i$ of the node does not appear in the aforesaid equation (5), in the case of the "working capacity equalization", it is seen that a portion of the system falls into failure at the tightness (shortage) of the capacity of the system. That is, the available total capacity of the small-capacity storage already runs out and the small-capacity storage completely loses a portion of the function.

SUMMARY OF THE INVENTION

The present invention has been developed with a view to eliminating the above-mentioned problems, and it is therefore an object of the invention to provide to carry out efficient and stable operation control of a system even if the usage rate of the entire system varies under a situation in which the characteristics of storage units, such as the maximum available total capacities or speed performance, differ largely from each other.

For achieving this purpose, in accordance with an aspect of the present invention, there is provided a distributed storage system comprising a plurality of storage units made to store data and including a storage unit different in maximum available total capacity from the others, control modules each connected to each of the storage units for controlling the access to each of the storage units, association means for associating logical storage areas, from/in which data is to be read/written by a data processing unit utilizing storage functions of the plurality of storage units, with physical storage areas on the storage units, monitor means for monitoring information on a total volume of data stored in each of the storage units or in all the storage units, index value calculating means for calculating an index value on the basis of a result of the monitor by the monitor means, and location means for distributively locating (allocating) or relocating the logical storage areas in the physical storage areas on the plurality of storage units through the control modules on the basis of the index value calculated by the index value calculating means.

In this case, it is also appropriate that the monitor means monitors a usage rate of the entire system, which is a ratio of a data total volume stored in all the storage units or a stored data volume in each of the logical storage areas on all the storage units to the maximum available total capacity of all the storage units, and the index value calculating means calculates the index value on the basis of the usage rate of the entire system monitored by the monitor means.

In addition, it is also appropriate that the plurality of storage units are classified into a plurality of classes whose service attributes are set in advance, and an attribute required for the data to be read/written by the data processing unit is set in the data in advance so that the location means determines a service attribute according to the required attribute of the data to be distributively located/relocated to carry out the distributive location/relocation of the data in the physical storage areas on the storage units pertaining to the class in which the determined service attribute is set.

Still additionally, it is also appropriate that the distributed storage system further comprises at least one of notification means for, when the usage rate of the entire system monitored by the monitor means exceeds a level set in advance, notifying this fact to a system manager and means for automatically adding a spare storage unit, prepared in advance, through a control module for the spare storage unit.

Yet additionally, it is also appropriate that the index value calculating means or the location means is mounted in at least one of the control module, the data processing unit, an independent dedicated module, a system control module and a communication unit (provided on a communication line for making connections between the data processing unit and the plurality of control modules so that they are mutually communicable).

Furthermore, in accordance with another aspect of the present invention, there is provided a distributed storage system comprising, in addition to the above-mentioned plurality of storage units, control modules and association means, monitor means for monitoring information on total data volume stored in each of or all of the storage units or a residual available capacity, evaluation value calculating means for calculating an evaluation value (the degree of system stability) related to an stable operation of this system including the plurality of storage units on the basis of system information including a result of the monitor by the monitor means, and notification means for making notification to a system manager according to the evaluation value calculated by the evaluation value calculating means.

In this configuration, it is also appropriate that, on the basis of the system information including a result of the monitor by the monitor means, the evaluation value calculating means calculates, as the evaluation value (the degree of system stability), the executable number of times of recovery operation for, when one of the plurality of storage units loses data due to the occurrence of a failure, recovering the data. In this case, the evaluation value calculating means is made to successively execute the feasibility decision processing on the recovery operation from first on the basis of the system information including the result of the monitor by the monitor means and, when a result of the decision shows that the recovery operation reaches a success, the evaluation value calculating means executes the feasibility decision processing on the next recovery operation and, when the result of the decision in the feasibility decision processing on the M-th recovery operation shows that the recovery operation reaches a success but the result of the decision in the feasibility decision processing on the (M+1)-th recovery operation shows that the recovery operation turns out a failure, handles the "M" as the executable number of times of the recovery operation.

Still furthermore, it is also appropriate that the distributed storage system further comprises comparison means for making comparison between the executable number M of times of the recovery operation and a threshold set in advance and automatic adding means for automatically adding the spare storage unit, prepared in advance, through the spare storage unit control module in accordance with a result of the comparison by the comparison means.

Yet furthermore, it is also appropriate that the distributed storage system further comprises comparison means for making comparison between the executable number M of times of the recovery operation and first and second thresholds (second threshold>first threshold) set in advance and automatic adding means for automatically adding the spare storage unit, prepared in advance, through the spare storage unit control module when a result of the comparison by the comparison means shows that the executable number M of times of the recovery operation becomes below the first threshold, with the notification means conducting the notification to the system manager when a result of the comparison by the comparison means shows that the executable number M of times of the recovery operation becomes below the second threshold.

Moreover, in accordance with a further aspect of the present invention, there is provided a control unit for a distributed storage system, which is designed to control the distributed storage system composed of a plurality of storage units made to store data and including a storage unit different in maximum available total capacity from the others, a control module connected to each of the storage units to control the access to each of the storage units, association means for associating logical storage areas, from/in which data is to be read/written by a data processing unit utilizing storage functions of the plurality of storage units, with physical storage areas of the storage units and monitor means for monitoring information on a total volume of data stored in each of the storage units or in all the storage units, said control unit comprising index value calculating means for calculating an index value on the basis of a result of the monitor by the monitor means, and location means for distributively locating or relocating the logical storage areas in the physical storage areas on the plurality of storage units through the control module on the basis of the index value calculated by the index value calculating means.

Still moreover, in accordance with a further aspect of the present invention, there is provided a control unit for a distributed storage system, which is designed to control the distributed storage system composed of a plurality of storage units made to store data and including a storage unit different in maximum available total capacity from the others, a control module connected to each of the storage units to control the access to each of the storage units, association means for associating logical storage areas, from/in which data is to be read/written by a data processing unit utilizing storage functions of the plurality of storage units, with physical storage areas of the storage units and monitor means for monitoring information on a total volume of data stored or an residual available capacity in each of the storage units, or in all the storage units, or residual available capacity, said control unit comprising evaluation value calculating means for calculating an evaluation value (the degree of system stability) related to an stable operation of this system including the plurality of storage units on the basis of system information including a result of the monitor by the monitor means, and notification means for making notification to a system manager according to the evaluation value calculated by the evaluation value calculating means.

According to the present invention mentioned above, the information on a total volume of data stored in each of the storage units or in all the storage units is monitored to distributively locate or relocate the logical storage areas in the physical storage areas of the plurality of storage units on the basis of an index value corresponding to the monitor result.

This enables carrying out the distributive location/relocation processing according to the information about the data total volume in each of the storage units or all the storage units, thus achieving the efficient and stable operation control on the system even if the usage rate of the entire system varies under a situation that the characteristics of the respective storage units, such as maximum available total capacity and speed performance, differ considerably from each other.

In this case, the usage rate of the entire system (ratio of the total data volume stored in all the storage units or the stored data volume in each of the logical storage areas to the maximum available total capacity of all the storage units) is monitored as the aforesaid information to execute the distributive location/relocation processing on the basis of an index value corresponding to this usage rate so that, for example, if the usage rate of the entire system is low, the working capacity equalization is made using the total data volume in each of the storage units as the index value for improving the response performance of the system through the parallel processing and, if the usage rate of the entire system is high, the residual capacity equalization is made using the residual capacity of each of the storage units as the index value for improving the stability of the entire system as much as possible, which can lengthen the life thereof until falling into the system capacity tightness.

Furthermore, with the distributed storage system according to the present invention, the information on a total volume of data stored in each of the storage units or in all the storage units or the residual available capacity is monitored to calculate the evaluation value (the degree of system stability) related to the stability of the system on the basis of the system information including the monitor result for making the notification to a system manager according to the evaluation value.

Accordingly, in a distributed storage system composed of a plurality of storage units including a storage unit(s) different in maximum available total capacity from the others, it is possible to eliminate the situation that the system stably operates until immediately before the usage limit state because consideration is given to the efficient and stable operation of the system so that difficulty is encountered in noticing the system capacity tightness, which allows this system to operate efficiently and very stably.

In particular, according to the present invention, a decision on the feasibility of the M-th (later) recovery operation is made on the basis of the present system resource using situation (the system information including the monitor result) and the executable number M of times of the recovery operation is calculated as the degree of system stability (evaluation value). That is, according to the present invention, in a distributed storage system, the degree M of system stability (M represents a non-negative integer) can be defined on the basis of the present system resource using situation in the clear and concrete meaning of "the M-th recovery operation turning out a success without fail", and the aforesaid system stability degree can accurately be calculated/decided through the use of the simple arithmetic and the comparison in magnitude.

DESCRIPTION OF THE PREFERRED EMBODIMENTS

Embodiments of the present invention will be described hereinbelow with reference to the drawings.

[1] Description of First Embodiment

Figure 1:
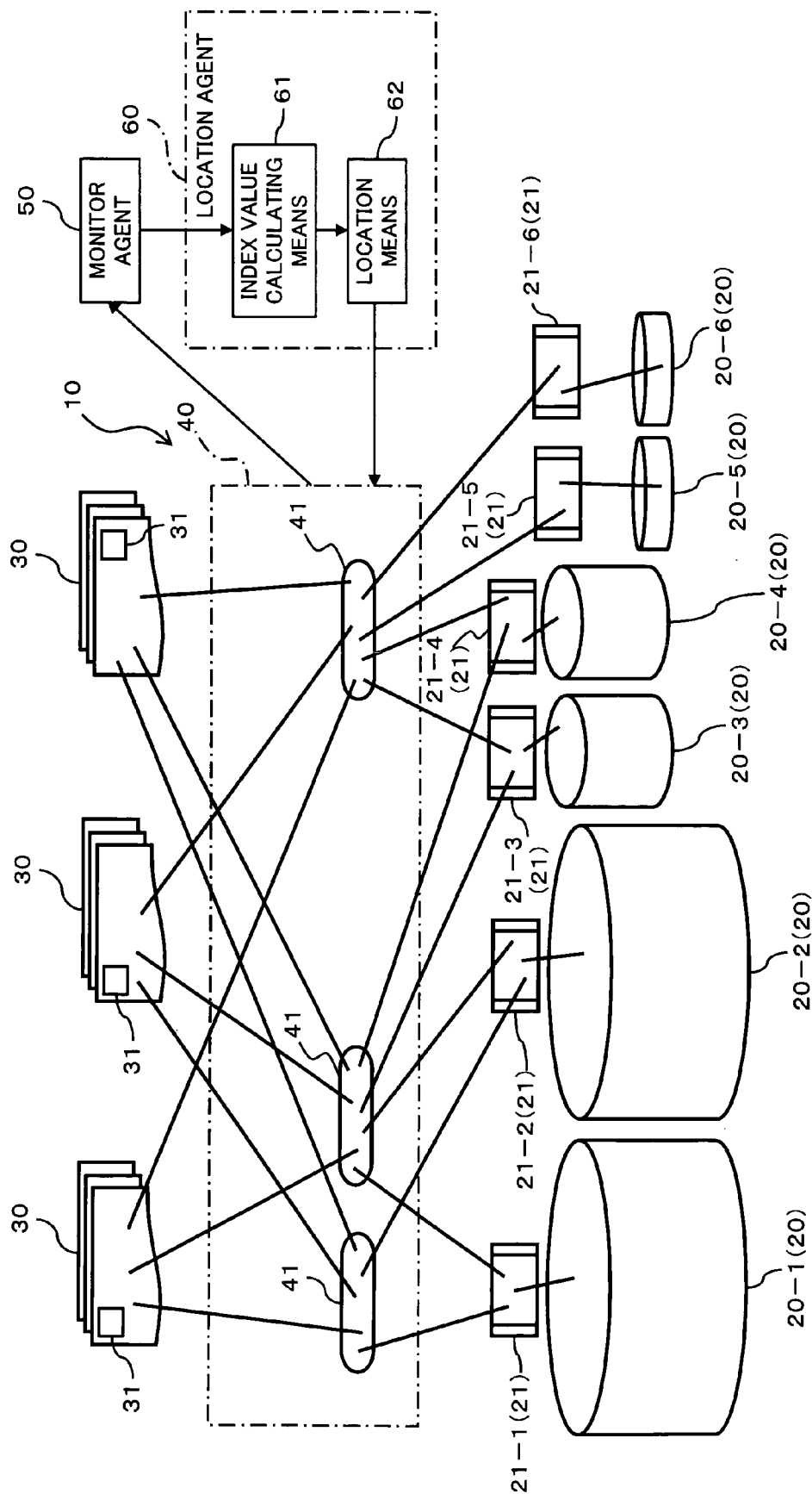
FIG. 1 is a block diagram showing a configuration of a distributed network storage system (distributed storage system) according to a first embodiment of the present invention.

FIG. 1 is a block diagram showing a configuration of a distributed network storage system (distributed storage system) according to a first embodiment of the present invention. As FIG. 1 shows, a distributed network storage system, generally designated at reference numeral 10, according to the first embodiment is made up of storage units 20 (20-1 to 20-6), control modules 21 (21-1 to 21-6), data processing units 30, a network 40, a monitor agent 50 and a location agent 60.

Each of the storage units (physical storage units) 20 is for storing data and in the system 10 according to this embodiment, the storage units 20 are six in number and are different in maximum available total capacity from each other. In the following description, the reference numerals 20-1 to 20-6 are used when distinguishing between the storage units 20, and the reference numeral 20 is used when the distinguishing therebetween is not needed in particular. Moreover, in the system 10 according to this embodiment, let it be assumed that the storage units 20-1 and 20-2 have the largest maximum available total capacity, the storage units 20-3 and 20-4 have the second-largest maximum available total capacity, and the storage units 20-5 and 20-6 have the smallest maximum available total capacity.

The storage units 20-1 to 20-6 are respectively additionally equipped with the control modules 21-1 to 21-6 for controlling the access to the storage units 20-1 to 20-6, and the storage units 20-1 to 20-6 are connected through the control modules 21-1 to 21-6 to the network 40. Also with respect to the control modules 21 (21-1 to 21-6), the reference numerals 21-1 to 21-6 are used when distinguishing therebetween, and the reference numeral 21 is used when there is particularly no need to distinguish therebetween.

Each of the data processing units (user side terminals) 30 is made to utilize the storage functions of the storage units 20 and includes an association map (association means) 31 for associating logical storage areas, from/in which data is to be read/written by the data processing unit 30, with physical storage areas on the storage unit 20. In the system 10 according to this embodiment, the data processing units 30 are three in number and they are connected to the network 40.

Although, in fact, data are distributively stored in the physical storage areas of the respective storage units 20, when a virtual read/write access instruction with respect to the logical storage areas (=virtual disk volume) different from the aforesaid physical storage areas is issued from the data processing unit(s) 30 utilizing the storage function of this system 10, the actual access to the actual physical data is made through the use of the association map 31.

In this connection, the function (association map 31 and the like) for the association between the logical storage areas and the physical storage areas can be mounted (packaged) in the data processing unit(s) 30 like this embodiment and, alternatively, it can also be mounted in a module on a side (instruction issuing side) close to the data processing unit 30, mounted in a module on a side (instruction implementing side) close to the storage unit 20, mounted in a dedicated module existing at an intermediate position therebetween, or mounted in the vicinity of a communication device (aftermentioned hub 41, or the like) on a communication line constituting the network 40.

The network (network connection means, communication line) 40 is for communicably making connections among the control modules 21, the data processing units 30, mentioned above, and the monitor agent 50 and the location agent 60 which will be mentioned later, and three hubs (communication devices) 41 are provided on a communication line constituting the network 40.

The monitor agent (monitor means) 50 is for monitoring, through the network 40, the information about the total volume of data stored in each of the storage units 20 or in all the storage units 20, and the information to be monitored by the monitor agent 50 will be mentioned later.

The location agent 60 is composed of an index value calculating means 61 and a location means 62. The index value calculating means 61 is for calculating an index value in accordance with a result of the monitor by the monitor agent 50, and the location means 62 is for conducting the data movement to realize the system equalization and for distributively locating or relocating the logical storage areas on the physical storage areas of the storage units 20 through the network 40 and the control modules 21.

Through the use of the functions of these index value calculating means 61 and location means 62, and the communication function of the control modules 21 (communication function between the control modules 21 using the network 40), for more desired system utilization state, the distributive location of data (distributive disposition of the logical storage areas in the physical storage areas on the storage units 20) is implemented with respect to the storage units 20 and the data movement (relocation of the logical storage areas in the physical storage areas on the storage units 20) is conducted between the storage units 20. The index value to be calculated by the index value calculating means 61 and the distributive location/relocation to be conducted by the location means 62 will be described later.

In the system 10 according to this embodiment, although the monitor agent 50 and the location agent 60 are provided as independent dedicated modules, it is also appropriate that the functions of the monitor agent 50 and the location agent 60 are put in the same dedicated module, or that they are provided as one of a large number of functions of a system control module (system general-purpose control module). Moreover, it is also appropriate that the functions of the monitor agent 50 and the location agent 60 are mounted in at least one of the control module 21, the data processing unit 30 and the hub 41, or that they are distributively mounted in the control module 21, the data processing unit 30 and the hub 41. Moreover, it is also appropriate that the functions of the monitor agent 50 and the location agent 60 are mounted in a module on a side (instruction issuing side) close to the data processing unit 30, mounted in a module on a side (instruction implementing side) close to the storage unit 20, mounted in a dedicated module existing at an intermediate position therebetween, or mounted in the vicinity of a communication device (the above-mentioned hub 41, or the like) on a communication line constituting the network 40.

A more detailed description will be given hereinbelow of an operation control method in the system 10, that is, the information to be monitored by the monitor agent 50, the index value to be calculated by the index value calculating means 61 and the distributive location (allocation)/relocation to be implemented by the location means 62.

[1-1] First Method (Case of Employment of Working Capacity Equalization)

The monitor agent 50 monitors the usage rate of the entire system, that is, the ratio ρ of the total data volume $\Sigma U_j$ stored in all the storage units 20 (or the stored data volume in each of the logical storage areas) to the maximum available total capacity $\Sigma T_j$ of all the storage units 20 in every moment. Moreover, when the monitored usage rate ρ is lower than a first predetermined value set in advance, the index value calculating means 61 acquires, as the aforesaid index value, the total data volume (working capacity) $U_i$ stored in the respective storage units 20 in every moment (or the stored data volume (working capacity) in each of the logical storage areas) from the monitor agent 50, and the location means 62 carries out the distributive location/relocation of the logical storage areas to equalize the working capacities $U_i$ of the storage units acquired by the index value calculating means 61. In fact, the location means 62 performs the data movement (working capacity equalization) according to $\Delta U_i$ in the aforesaid equation (5) as mentioned above.

Under a situation in which the difference in maximum available total capacity between the individual storage units 20 reaches several times to several tens times and the difference in speed performance between the individual storage units 20 also reaches several times to several tens times, in a case in which the usage rate ρ is relatively low, more concretely, in a case in which the usage rate ρ is low such that the average working capacity of the entire system is smaller than the capacity of the minimum-size storage unit 20 in the system 10, the implementation of the working capacity equalization according to the aforesaid equation (5) creates a merit in that the response performance of the system 10 becomes higher through the parallel processing.

Accordingly, if the aforesaid first predetermined value is set to meet the above-mentioned condition, through the use of this first method, the improvement of the response performance of the system 10 becomes feasible even if the usage rate of the entire system becomes relatively low under a situation in which the characteristics of the respective storage units 20, such as the maximum available total capacities and the speed performances, are largely different from each other.

[1-2] Second Method (Case of Employment of Residual Capacity Equalization)

As well as the above-described first method, the monitor agent 50 monitors the usage rate ρ of the entire system. Moreover, when the monitored usage rate ρ is higher than a second predetermined value set in advance, the index value calculating means 61 calculates, as the aforesaid index value, the difference (residual capacity) between the maximum available total capacity $T_i$ of each of the storage units 20 and the total volume of data stored in each of the storage units 20 on the basis of a result of the monitor by the monitor agent 50 in every moment, and the location means 62 carries out the distributive location/relocation of the logical storage areas to equalize the residual capacities $U_i$ of the storage units calculated by the index value calculating means 61. In fact, the location means 62 performs the data movement (residual capacity equalization) according to $\Delta R_i$ in the aforesaid equation (9) as mentioned above.

Under a situation in which the difference in maximum available total capacity between the individual storage units 20 reaches several times to several tens times and the difference in speed performance between the individual storage units 20 also reaches several times to several tens times, in a case in which the usage rate is relatively high (that is, in a capacity tightness condition), more concretely, in a case in which the usage rate ρ becomes higher such that the average working capacity of the entire system exceeds, for example, 50% with respect to the capacity of the maximum-size storage unit 20 in the system 10, the implementation of the residual capacity equalization according to the aforesaid equation (9) can enhance the stability of the entire system as much as possible to realize an action in a direction of lengthening the life of the system 10 until reaching a capacity tightness condition.

Accordingly, if the aforesaid second predetermined value is set to meet the above-mentioned condition, through the use of this second method, the stability of the entire system is enhanced to lengthen the life of the system 10 until reaching a capacity tightness condition even if the usage rate of the entire system becomes relatively high under a situation in which the characteristics of the respective storage units 20, such as the maximum available total capacities and the speed performances, are largely different from each other.

[1-3] Third Method (Capacity Usage Rate Equalization)

The monitor agent 50 monitors the total volume $U_i$ of data stored in each of the storage units 20 (or the stored data volume in each of the logical storage areas) in every moment. Subsequently, the index value calculating means 61 calculates, as the index value, the difference between the logarithmic value of a ratio (capacity usage rate) $u_i$ of the monitored total volume $U_i$ of data in each of the storage units 20 (or the stored data volume in each of the logical storage areas) to the maximum available total capacity $T_i$ of each of the storage units 20 and the logarithmic value of the geometric mean of the rates $u_i$. Moreover, the location means 62 carries out the distributive location/relocation of the logical storage areas so that the index value calculated in the index value calculating means 61 approaches zero. That is, according to the third method, the location means 62 operates to bring the capacity usage rate $u_i$ close to the geometric mean value, and actually carries out the data movement (capacity usage rate equalization) according to $\Delta u_i'$ of an after-mentioned equation (11). Incidentally, in this case, although the total volume $U_i$ of data (or the stored data volume in each of the logical storage areas) is monitored by the monitor agent 50, the monitoring of the aforesaid ratio (capacity usage rate) $u_i$ is also acceptable.

A more concrete description will be given hereinbelow of the capacity usage rate equalization.

The capacity usage rate equalization carries out an operation whereby the capacity usage rates $u_i \equiv U_i/T_i$ become the same level u with respect to different maximum available total capacities wherever possible. This operation is equivalent to the operation whereby the logarithm $u_i' \equiv \log u_i$ becomes the same level $u' \equiv \log u$. From this, in a common resource location, the "improving effort" index value $\Delta u_i'$ for each node i (storage unit 20-i; in FIG. 1, i=1, 2, ..., 6) can be defined as expressed by the following equations (10) and (11). In this case, the user's data flows into the node of $\Delta u_i' > 0$.

$$\Delta u_i' = \overline{u'} - u_i' \qquad (10)$$

where $$\overline{u'} \equiv \frac{1}{N} \sum_{i=1}^{N} u_i'$$

N denotes the total number of nodes (storage units 20)

Eventually, the first term of the right side of the aforesaid equation (10) becomes the logarithmic value of the geometric mean (=geometric average)(note: in general, the geometric mean is used as the average value of "rate" such as "rate of increase in prices").

In this case, through simple arithmetic, the following equation (11) is derivable from the aforesaid equation (10).

$$\Delta u_i' = \left( \frac{1}{N} \sum_{j=1}^{N} \log U_j - \log U_i \right) - \left( \frac{1}{N} \sum_{j=1}^{N} \log T_j - \log T_i \right) \qquad (11)$$

In a system in which the sizes $T_i$ of nodes (storage units 20) are identical to each other, the "capacity usage rate equalization" described above takes action equivalent to the "working capacity equalization" or the "residual capacity equalization".

On the other hand, under a situation in which the difference in size $T_i$ between the nodes reaches several times to several tens times and the difference in speed performance therebetween reaches several times to several tens times, when the usage rate ρ of the entire system is relatively low, in the aforesaid equation (11), due to the property of the logarithmic function, the absolute value of the first term of the right side is larger than the absolute value of the second term of the right side in most cases. Therefore, in the "capacity usage rate equalization", the contribution of the second term of the right side decreases while the first term of the right side gains ascendancy, that is, shows as behavior similar to the "working capacity equalization" according to the aforesaid equation (5).

Conversely, if the usage rate ρ of the entire system is relatively low under the above-mentioned situation (in a capacity tightness condition), in the aforesaid equation (11), the contribution of the first term of the right side and the contribution of the second term thereof becomes almost equal to each other. Therefore, the "capacity usage rate equalization" shows a behavior analogous to the "residual capacity equalization" according to the aforesaid equation (9).

That is, in the case of a low usage rate ρ of the entire system, the behavior of the "capacity usage rate equalization" according to the aforesaid equation (11) approaches the behavior of the "working capacity equalization" according to the aforesaid equation (5), thus improving the response performance of the system 10. On the other hand, in the case of a high usage rate ρ of the entire system, it approaches the behavior of the "residual capacity equalization" according to the aforesaid equation (9), thus improving the stability performance of the system 10. Accordingly, even if the usage rate of the entire system varies under a situation in which the characteristics of the respective storage units 20, such as the maximum available total capacity (size $T_i$) or the speed performance, are largely different from each other, it is possible to efficiently and stably implement the operational control on the system 10.

[1-4] Other Equalization Index Function

Furthermore, a function other than the equation (11) is proposed as a function showing a behavior similar to that of the "capacity usage rate equalization" according to the equation (11).

As one example, there is proposed an equalization index function $f_i$ expressed by the following equation (12).

$$f_i \equiv (\overline{U} - U_i) - \rho(\overline{T} - T_i) \tag{12}$$

However, $\rho$ of the aforesaid equation (12) represents the above-mentioned usage rate of the entire system, and it is defined by the following equation (13).

$$\rho \equiv \Sigma U_j / \Sigma T_j = \overline{U}/\overline{T} \tag{13}$$

In this case, when the dimensionless index function $f_i'$ of the aforesaid equalization index function $f_i$ is defined as expressed by the following equation (14), through simple arithmetic, the following equations (15) and (16) are obtainable on the basis of the aforesaid equations (12) and (13).

$$f_i' \equiv f_i / \overline{U} \tag{14}$$

$$f_i' = \frac{T_i}{\overline{T}} - \frac{U_i}{\overline{U}} \tag{15}$$

$$\left(\frac{1}{N}\right) f_i' = \frac{T_i}{\Sigma T_j} - \frac{U_i}{\Sigma U_j} \tag{16}$$

The equalization index function given by the aforesaid equation (16) signifies that, preferably, the rate (ratio) of the consumption quantity (working capacity) of each node to the system total consumption quantity $\Sigma U_j$ is equalized to the rate of size $T_i$ of each node to the system total size $\Sigma T_j$.

Moreover, for changing the dimensionlessness method, viewing the following equation (17) obtained by placing the dimensionless index function into $g_i' \equiv f_i / T^i$, this $g_i'$ is the "capacity usage rate equalization index function" on the definition somewhat different from the aforesaid equation (10) or (11)(almost same definition in meaning). In this case, the difference between the aforesaid equation (15) and the following equation (17) basically stems from only the change of the dimensionlessness method and, hence, they are the same type in algorithm mounting level.

$$g_i' = \frac{\overline{U}}{\overline{T}} - \frac{U_i}{T_i} \tag{17}$$

In addition, as another example, there is proposed the equalization index function $F_{2i}$ expressed by the following equation (18).

$$F_{2i} \equiv (\overline{U} - U_i) - \rho^2 (\overline{T} - T_i) \tag{18}$$

In comparison with the index function $f_i$ expressed by the aforesaid equation (12), the trend in this index function $F_{2i}$ expressed by the following equation (18) is further toward showing a behavior similar to the "working capacity equalization" when the usage rate of the entire system is relatively low and showing a behavior similar to the "residual capacity equalization" when the usage rate of the entire system is relatively high (that is, in a capacity tightness condition).

When the dimensionless index function $F_{2i}'$ of the aforesaid equalization index function $F_{2i}$ is defined as expressed by the following equation (19), through simple arithmetic, the following equation (20) is obtainable on the basis of the aforesaid equation (18).

$$F_{2i}' \equiv F_{2i} / \overline{U} \tag{19}$$

$$F_{2i}' \equiv \left(\frac{T_i}{\overline{T}} - \frac{U_i}{\overline{U}}\right) + \left(1 - \frac{T_i}{\overline{T}}\right) \cdot \left(1 - \frac{\overline{U}}{\overline{T}}\right) \tag{20}$$

In the equation (20), the first term of the right side is the same as $f_i'$ of the aforesaid equation (15), and the second term of the right side is the "multiplication of a residual capacity rate of the entire system by a proper factor according to the size $T_i$ of the node itself". The proper factor to be used here takes a negative value when $T_i$ is larger than the average value of the sizes of all the nodes and takes a plus value when $T_i$ is smaller than it.

Secondly, an examination is made on the index function $F_{\eta i}$ of the following equation (21) obtained by generalizing the aforesaid equations (12) and (18).

$$F_{\eta i} \equiv (\overline{U} - U_i) - \rho^{\eta} (\overline{T} - T_i) \tag{21}$$

When the dimensionless index function $F_{\eta i}'$ of the aforesaid equalization index function $F_{\eta i}$ is defined as expressed by the following equation (22), through simple arithmetic, the following equation (23) is obtainable on the basis of the aforesaid equation (21).

$$F_{\eta i}' \equiv F_{\eta i} / \overline{U} \tag{22}$$

$$F_{\eta i}' \equiv \left(\frac{T_i}{\overline{T}} - \frac{U_i}{\overline{U}}\right) + \left(\frac{\overline{T} - T_i}{\overline{T}}\right) \cdot \left\{1 - \left(\frac{\overline{U}}{\overline{T}}\right)^{\eta-1}\right\} \tag{23}$$

In the equation (23), the first term of the right side is the same as $f_i'$ of the aforesaid equation (15), and the second term of the right side is the "multiplication of a "pseudo residual capacity rate", corresponding to a value obtained by raising the usage rate of the entire system to $(\eta-1)$-th power, by a proper factor according to the size $T_i$ of the node itself". As well as the factor for the aforesaid equation (20), the proper factor to be used here takes a negative value when $T_i$ is larger than the average value of the sizes of all the nodes and takes a plus value when $T_i$ is smaller than it.

In this connection, when the dimensionlessness method according to the aforesaid equation (22) is changed and the dimensionless index function is defined as $G_{\eta i}' \equiv F_{\eta i}/T_i$, the "generalized index function" exposed by the following equation (24), somewhat different from the aforesaid equation (23), is obtainable. In this case, the difference between the aforesaid equation (23) and the following equation (24) basically originates from only the change of the dimensionlessness method and, hence, they are the same type in algorithm mounting level.

$$G_{\eta i}' \equiv \left(\frac{\overline{U}}{\overline{T}} - \frac{U_i}{T_i}\right) + \left(\frac{\overline{T} - T_i}{T_i}\right) \cdot \left\{1 - \left(\frac{\overline{U}}{\overline{T}}\right)^{\eta-1}\right\} \cdot \left(\frac{\overline{U}}{\overline{T}}\right) \tag{24}$$

In the equation (24), the first term of the right side is the same as $g_i'$ of the aforesaid equation (17), and the second term of the right side is an index signifying the "multiplication of the product of the usage rate of the entire system and a "pseudo residual capacity rate", corresponding to a value obtained by raising the usage rate of the entire system to $(\eta-1)$-th power, by a proper factor according to the size $T_i$ of the node itself". The proper factor to be used here takes a negative value when $T_i$ is larger than the average value of the sizes of all the nodes and takes a plus value when $T_i$ is smaller than it, which is slightly different from the factor of the aforesaid equation (20).

Figure 2:
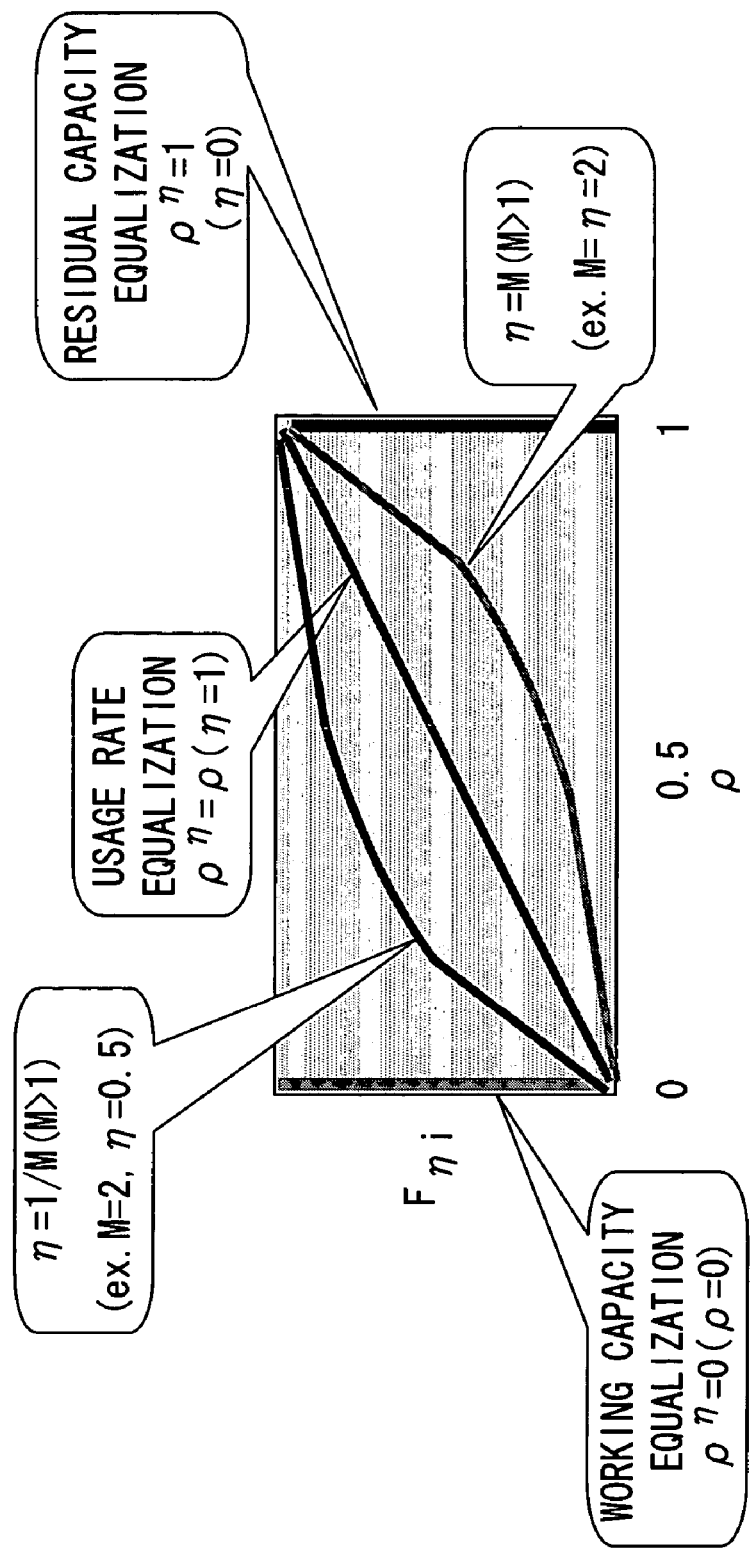
FIG. 2 is a graphic illustration for explaining an operation in the first embodiment.

The generalized index function $F_{\eta i}$ of the aforesaid equation (21) is a parameter for determining the "relocation behavior" of the system 10, and FIG. 2 is a graphic illustration of the relationship between this parameter $F_{\eta i}$ and the usage rate ρ.

As FIG. 2 shows, in the case of $\rho^\eta=0$ (ρ=0), the "working capacity equalization" is conducted with the aforesaid equation (21) being equivalent to the aforesaid equation (5), and in the case of $\rho^\eta=1$ (η=0 or ρ=1), the "residual capacity equalization" is conducted with the aforesaid equation (21) being equivalent to the aforesaid equation (9), and in the case of $\rho^\eta=\rho(\eta=1)$, the "capacity usage rate equalization" is conducted with the aforesaid equation (21) being equivalent to the aforesaid equation (12).

Moreover, in the aforesaid equation (21), in the case of η=M (M>1; for example, M=η=2) or in the case of η=1/M (M>1; for example, η=0.5 for M=2)(that is, η≠1), the equalization according to the aforesaid equation (21) is basically almost equivalent to the capacity usage rate equalization according to the aforesaid equation (12), and when the usage rate of the entire system is low, the response performance improves, and when the usage rate of the entire system is high, the stability improves.

However, the equalization according to the aforesaid equation (21) in the case of η≠1 is said to be a variation of the capacity usage rate equalization according to the aforesaid equation (12) and, as shown in FIG. 2, since the convergent point of the system is positioned at a balance different from the equalization according to the aforesaid equation (21) in the case of η=1 (that is, the capacity usage rate equalization according to the aforesaid equation (12)), it shows a behavior slightly different from the capacity usage rate equalization according to the aforesaid equation (12). That is, the equalization behavior is adjustable in a manner such that the balance of the convergent point of the system is changed by changing the value of η in the aforesaid equation (21).

The operation control methods for the system 10 using the equalization index functions described above with reference to the aforesaid equations (12) to (24) are concluded as follows. However, since the equalization behavior of each of the methods has been described above, the description thereof will be omitted for brevity.

[1-4-1] Fourth Method

The index value calculating means 61 calculates, as the aforesaid index value, a value obtained by performing the addition or subtraction on the maximum available total capacity $T_i$ of each of the storage units 20 and a total volume $U_i$ of data stored in each of the storage units 20 in every moment and monitored by the monitor agent 50 (or a stored data volume in each of the logical storage areas) after weighted. Moreover, the location means 62 carries out the distributive location/relocation of the logical storage areas to equalize the index values calculated by the index value calculating means 61. The index value to be calculated according to this fourth method includes the index value to be calculated according to the aforesaid equation (12), (18) or (21).

[1-4-2] Fifth Method

The index value calculating means 61 calculates, as the aforesaid index value, the difference between a value obtained by multiplying the maximum available total capacity $T_i$ of each of the storage units 20 by, as a weight, a usage rate ρ of the entire system (see the aforesaid equation (13)) monitored by the monitor agent 50 and a total volume $U_i$ of data stored in each of the storage units 20 in every moment and monitored by the monitor agent 50 (or a stored data volume in each of the logical storage areas). Moreover, the location means 62 carries out the distributive location/relocation of the logical storage areas so as to equalize the index values calculated by the index value calculating means 61. That is, the fifth method is a further limitation of the foregoing fourth method and, according to this fifth method, the index value is calculated using the aforesaid equation (12)(that is, η=1 in the aforesaid equation (21)).

[1-4-3] Sixth Method

The index value calculating means 61 calculates, as the aforesaid index value, the difference between a value obtained by multiplying the maximum available total capacity $T_i$ of each of the storage units 20 by a value obtained as a weight by raising a usage rate ρ of the entire system monitored by the monitor agent 50 to the M-th power (M>1) and a total volume $U_i$ of data stored in each of the storage units 20 in every moment and monitored by the monitor agent 50 (or a stored data volume in each of the logical storage areas). Moreover, the location means 62 carries out the distributive location/relocation of the logical storage areas so as to equalize the index values calculated by the index value calculating means 61. That is, the sixth method is also a further limitation of the foregoing fourth method and, according to this sixth method, the index value is calculated using the aforesaid equation (18) or the aforesaid equation (21) where η=M (M>1).

[1-4-4] Seventh Method

The index value calculating means 61 calculates, as the aforesaid index value, the difference between a value obtained by multiplying the maximum available total capacity $T_i$ of each of the storage units 20 by the M-th root (M>1) of a usage rate ρ of the entire system monitored by the monitor agent 50, which acts as a weight, and a total volume $U_i$ of data stored in each of the storage units 20 in every moment and monitored by the monitor agent 50 (or a stored data volume in each of the logical storage areas). Moreover, the location means 62 carries out the distributive location/relocation of the logical storage areas so as to equalize the index values calculated by the index value calculating means 61. That is, the seventh method is also a further limitation of the foregoing fourth method and, according to this seventh method, the index value is calculated using the aforesaid equation (21) the index value is calculated using the aforesaid equation (21) where η=1/M (M>1).

[1-4-5] Eighth Method

The index value calculating means 61 calculates, as the aforesaid index value, the difference between the rate (ratio) of a total volume $U_i$ of data stored in each of the storage units 20 in every moment and monitored by the monitor agent 50 (or a stored data volume in each of the logical storage areas) and the maximum available total capacity $T_i$ of each of the storage units 20 and a usage rate ρ of the entire system (seethe aforesaid equation (13)) monitored by the monitor agent 50. Moreover, the location means 62 carries out the distributive location/relocation of the logical storage areas so that the aforesaid index value calculated by the index value calculating means 61 approaches zero (so that $U_i/T_i$ is brought close to the usage rate ρ). That is, according to this eighth method, the index value is calculated using the aforesaid equation (17).

[1-4-6] Ninth Method

The index value calculating means 61 calculates, as the aforesaid index value, the difference between the ratio (rate) of a total volume $U_i$ of data stored in each of the storage units 20 in every moment and monitored by the monitor agent 50

(or a stored data volume in each of the logical storage areas) to a total volume $\Sigma U_j$ of data stored in all the storage units 20 in every moment and monitored by the monitor agent 50 (or a stored data volume in each of the logical storage areas) and the ratio of the maximum available total capacity $T_i$ of each of the storage units 20 to a maximum available total capacity $\Sigma T_j$ of all the storage units 20. Moreover, the location means 62 carries out the distributive location/relocation of the logical storage areas so that the aforesaid index value calculated by the index value calculating means 61 approaches zero (so that $U_i/\Sigma U_j$ is brought close to $T_i/\Sigma T_j$). That is, according to this ninth method, the index value is calculated using the aforesaid equation (16)(or using the aforesaid equation (15)).

The above-described first embodiment of the present invention enables carrying out the distributive location/relocation according to the information on the total volume ($U_i$ or $\Sigma U_i$) of data in each of the storage units 20 or in all the storage units and, hence, the efficient and stable operation control on the system 10 becomes feasible even if the usage rate ρ of the entire system varies under a situation in which the characteristics of the storage units 20, such as the maximum available total capacity $T_i$ or the speed performance, differ largely from each other.

In particular, in a case in which, as mentioned above, the usage rate ρ of the entire system becomes relatively low under a situation in which the difference in maximum available total capacity $T_i$ between the individual storage units 20 reaches several times to several tens times and the difference in speed performance between the storage units 20 also reaches several times to several tens times, the implementation of the working capacity equalization according to the aforesaid equation (5) can further build up the response performance of the system 10 through the parallel processing. Conversely, in a case in which the usage rate ρ of the entire system becomes relatively high under a similar situation (in a capacity tightness condition), the implementation of the residual capacity equalization according to the aforesaid equation (9) can enhance the stability of the entire system to lengthen the life of the system 10 until reaching a capacity tightness condition.

Moreover, in a case in which the capacity usage rate equalization according to the aforesaid equation (11) or (12) is implemented under a situation similar thereto, if the usage rate of the entire system is low, because it approaches the behavior of the aforesaid equation (5), the response performance of the system 10 improves. On the other hand, if the usage rate of the entire system is high, because of approaching the behavior of the aforesaid equation (9), the stability performance of the system 10 improves.

Still moreover, in the case of the implementation of a variation of the capacity usage rate equalization according to the aforesaid equation (18)(η=2 in the aforesaid equation (21)) or the aforesaid equation (21)(η≠1), a behavior slightly different from the capacity usage rate equalization according to the aforesaid equation (12) is realizable as shown in FIG. 2. Therefore, the balance of the convergent point of the system can be changed by changing the value of η in the aforesaid equation (21), thereby adjusting the equalization behavior. When η is properly set through the use of such a property, as will be described later in the third embodiment, the operations such as data location can be conducted in a balance according to situations or characteristics of the in a balance according to situations or characteristics of the system 10.

In this connection, for the data movement by the relocation operation, the data movement is actually made after the determinations of the data on the movement side and the reception side (destination) and, in this case, if two different index values of the aforesaid plurality of index values (a plurality of methods are selected at the data determination and the destination termination, the system 10 can be let to a balance different from that in a case of the use of the same index value.

In addition, in the aforesaid equations (5), (9) and (11) to (21), a sum value obtained by totalizing the total volumes $U_i$ of the storage units 20 is used without discriminating the logical storage areas (=virtual disk volume). As the result of trial using this sum value, when viewed from each of the logical storage areas, there is a case in which two or more logical disk volumes, in each of which data is stored in a state concentrated, exist in a specific physical storage unit 20. In such a case, even if the working capacity equalization is made according to the aforesaid equation (5), there is a case in which the improvement of the response performance of the system 10 by the parallel processing does not reach sufficiency as a whole. In order to avoid such a situation, in the aforesaid equations (5) and (11) to (21), it is also appropriate that a sum value obtained by totalizing the data total volumes $U_i$ of the storage units 20 is used while discriminating the logical storage areas. In this connection, in a case in which, for the purpose of the improvement of the reliability, data are physically multiplexed and stored in the logical storage areas, it is desirable that a sum value obtained by totalizing the data total volumes $U_i$ is used while further discriminating the degrees of the multiplexed storages (first-order storage, second-order storage, . . . , Nth-order storage). This further improves the response performance in a case in which the usage rate of the system 10 is low. Moreover, the effective index value calculation becomes feasible even if the totalization result is used while discriminating the degrees of the multiplexed storages (first-order storage, second-order storage, . . . , Nth-order storage) but without discriminating the logical storage areas.

Still additionally, it is also possible that a required attribute (data required attribute) of data to be read/written by the data processing unit 30 is set in advance and the index value calculating means 61 determines selectively, from, for example, the above-described methods, an appropriate index value calculation method in accordance with the required attribute of data to be distributively located/relocated by the location means 62 to calculate the index value through the determined index value calculation method. Thus, individual data are distributively located/relocated in the physical storage areas of a plurality of storage units 20 according to their attributes. In this case, for example, the data required attribute indicates whether the data to be read/written by the data processing unit 30 is transaction data (speed-precedence data) or backup data (bit cost-precedence data).

[2] Description of Second Embodiment

Figure 3:
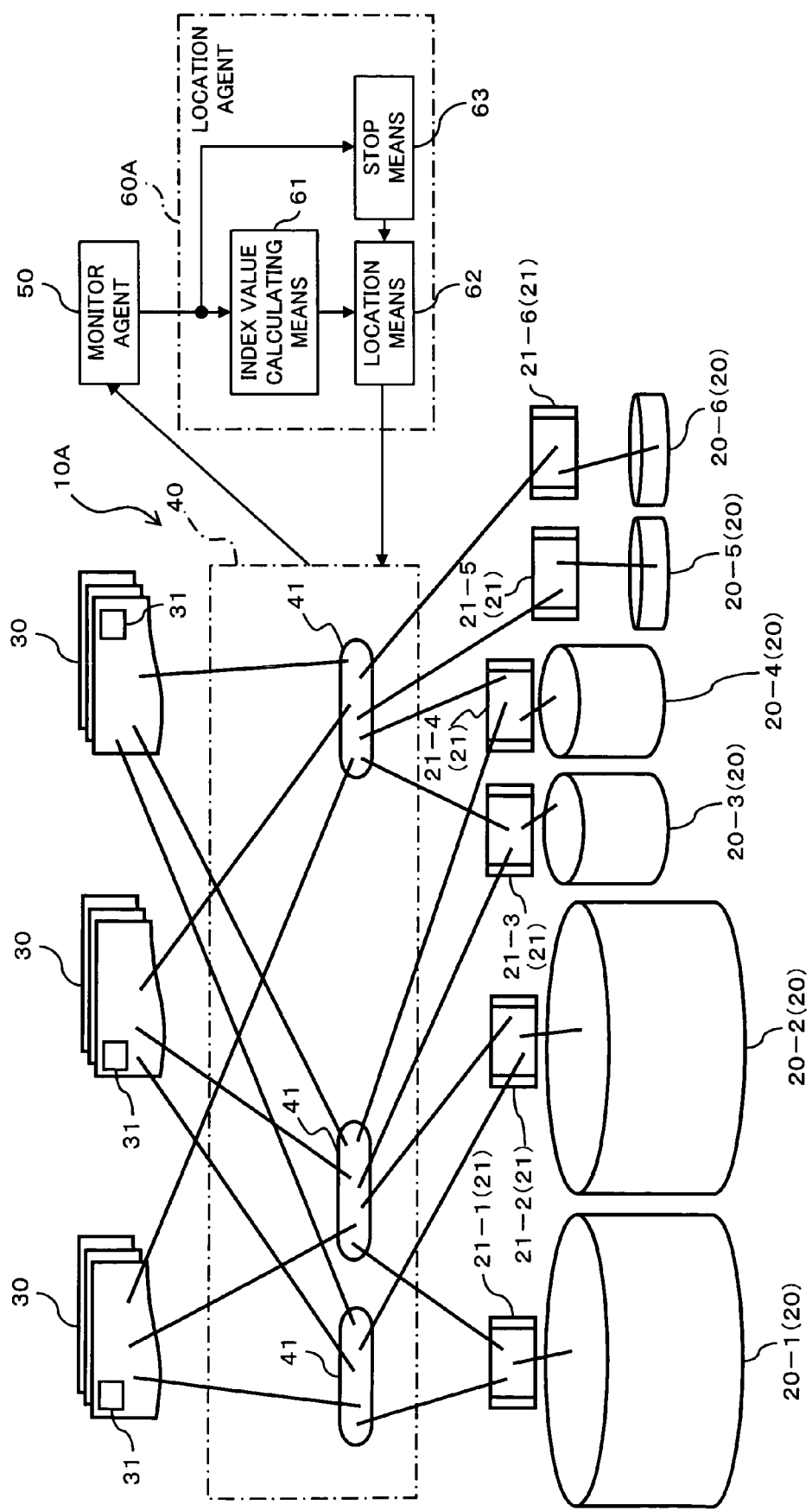
FIG. 3 is a block diagram showing a configuration of a distributed network storage system (distributed storage system) according to a second embodiment of the present invention.

FIG. 3 is a block diagram showing a configuration of a distributed network storage system (distributed storage system) according to a second embodiment of the present invention. As FIG. 3 shows, a distributed network storage system 10A according to the second embodiment is also configured almost similarly to the system 10 according to the first embodiment except that, in addition to an index value calculating means 61 and a location means 62 similar to those in the first embodiment, a stop means 63 is provided in a location agent 60A. In FIG. 3, the same reference numerals as those used above represent the same or almost same parts, and the description thereof will be omitted for brevity.

The stop means 63 additionally provided in the second embodiment receives a monitor result from the monitor agent 50 and has a function to, when detecting the fact that the equalization by the location means 62 is achieved above a predetermined level or that the aforesaid index value approaches zero beyond a predetermined level, stop further distributive location/relocation by the location means 62 at that time.

At the final stage of the relocation operation of the location means 62 of the system 10A (10), there can appears a behavior that the same data goes and returns like simple harmonic oscillation between two of a plurality of storage units 20. In fact, this behavior only produces the network communications involved in the data movement and the data storage situation of the system 10A (10) already reaches the final condition and, hence, there is no need to improve it. That is, this behavior only dissipates the network resource (network 40).

Therefore, according to the second embodiment, the stop means 63 is additionally provided, and thresholds on the level of the equalization by the location means 63 and on the level of achievement of the aforesaid index value are set so that, when detecting that the level of the equalization by the location means 62 or the level of the achievement of the aforesaid index value reaches the threshold (predetermined level), the stop means puts an end to the distributive location/relocation by the location means 62. This can reliably prevent the above-mentioned useless behavior from occurring, thereby suppressing the wasteful use of the network resource (network 40 or the like).

In addition, in the processing at the allocation of the logical volumes (logical storage areas) before the relocation operation, if the data storage destination is determined through the use of an evaluation index given by the equations (5), (9), (11), (12), (15) to (18) and (21), the wasteful use of the network resource (network 40 or the like) for the relocation is limited to special cases such as the new extension of the physical storage unit 20, which lessens the pressure on the network traffic in the system 10A.

[3] Description of Third Embodiment

Figure 4:
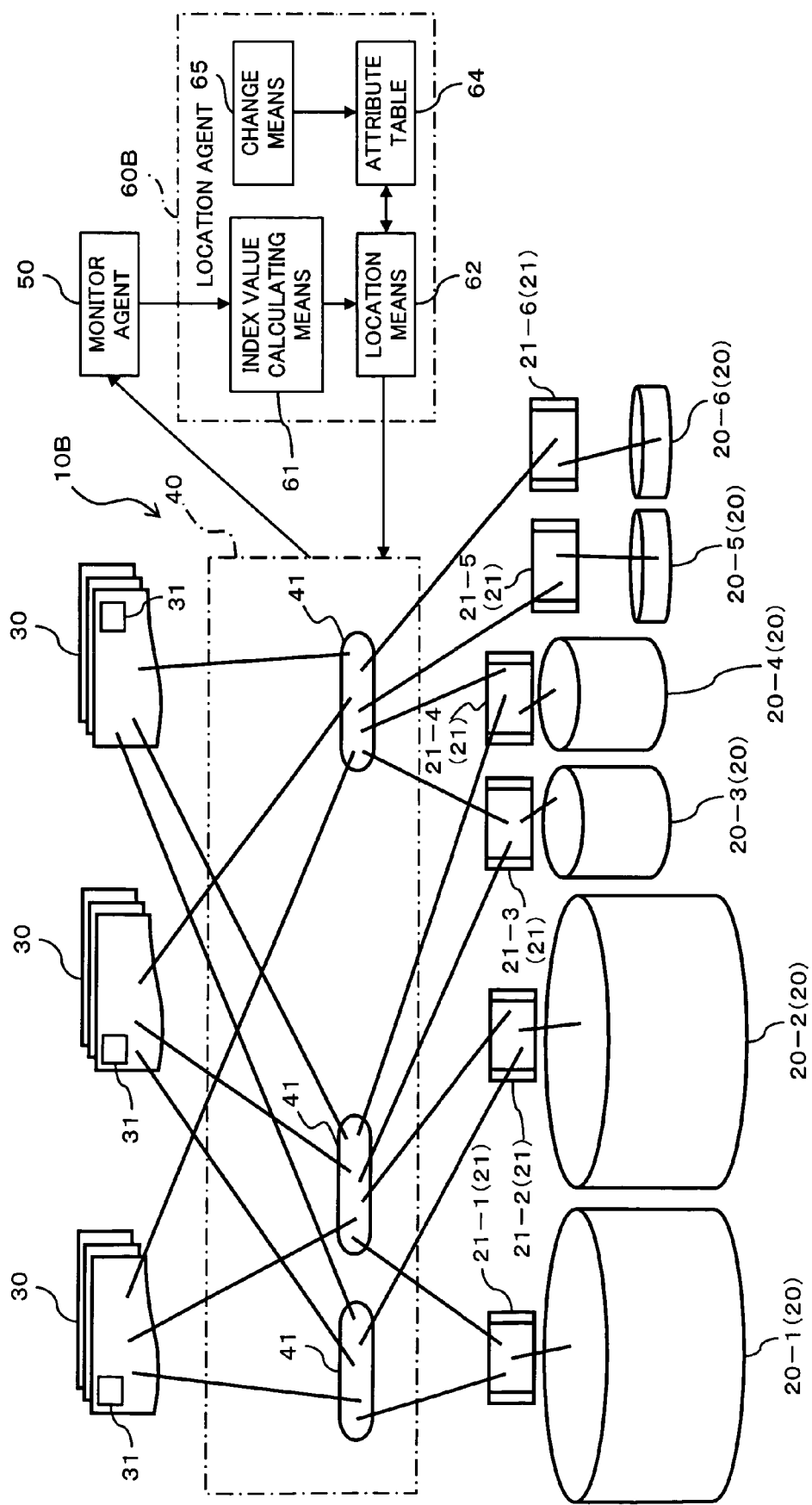
FIG. 4 is a block diagram showing a configuration of a distributed network storage system (distributed storage system) according to a third embodiment of the present invention.

FIG. 4 is a block diagram showing a configuration of a distributed network storage system (distributed storage system) according to a third embodiment of the present invention. As FIG. 4 shows, a distributed network storage system 10B according to the third embodiment is also configured almost similarly to the system 10 according to the first embodiment except that, in addition to an index value calculating means 61 and a location means 62 similar to those in the first embodiment, an attribute table 64 and a change means 65 are provided in a location agent 60B. In FIG. 4, the same reference numerals as those used above represent the same or almost same parts, and the description thereof will be omitted for brevity.

In the system 10B according to the third embodiment, a plurality of storage units 20 are classified into a plurality of classes whose service attributes (storage service attributes) are set in advance and a required attribute (data required attribute) on data to be read/written by the data processing unit(s) 30 is set in this data in advance.

In this case, the storage service attribute is based on the performance (for example, speed performance) of each of the storage units 20 or bit unit cost (for example, unit cost based on introduction cost and/or operation cost) of each of the storage units 20. Moreover, the data required attribute indicates whether the data to be read/written by the data processing unit 30 is transaction data (speed-precedence data) or backup data (bit cost-precedence data) and, in fact, it is given as a tag to the data.

In the system 10B according to the third embodiment, in the attribute table 64, there is previously set the association between the data required attribute given to data and the storage unit 20 pertaining to a class in which the storage service attribute corresponding to the data required attribute is set. More concretely, in this attribute table 64, the data required attribute indicative of the transaction (speed precedence) is associated with a class with a higher speed performance (group of the storage units 20 having a high speed performance), while the data required attribute indicative of the backup (bit cost precedence) is associated with a class with a low bit cost (group of the storage units 20 having a low bit cost).

Moreover, when carrying out the distributive location/relocation of the logical storage areas in the physical storage areas on the storage units 20 on the basis of the aforesaid index value calculated in the index value calculating means 61, the location means 62 according to the third embodiment sees the required attributes of data to be distributively located/relocated to recognize and determine the class, in which service attribute corresponding that required attribute is set, for carrying out the distributive location/relocation of the data in the physical storage areas on the storage units 20 pertaining to the determined class.

Still moreover, the change means 65 is for changing the aforesaid storage service attribute set for each class in accordance with a variation (for example, variation with age) of the physical state of each of the storage units 20 pertaining to this class and, as mentioned later, in a case in which a variation of the physical state of each of the storage units 20 occurs, the storage service attribute set for each class in the attribute table 64 is changed/adjusted in accordance with the variation. In fact, this change means 65 includes various types of inputting devices to be operated by an operator and the change of the storage service attribute in the attribute table 64 is made in accordance with an instruction the operator inputs through the various types of inputting devices.

At this time, it is also appropriate that the index value calculating means 61 determines an index value calculation method according to the required attribute of the distributive location/relocation data selectively from the various methods described in the first embodiment and calculates the aforesaid index value through the use of the determined index value calculation method.

Meanwhile, in Japanese Patent Laid-Open No. 2001-67187, as mentioned above, a plurality of storage units are classified into classes with attributes and managed and the load distribution is made so that the working time of each class per unit time does not exceed an upper limit value set for each class, thereby eliminating the hot spot.

On the other hand, in the system 10B according to the third embodiment, as described above, a speed-precedence tag is given to the speed performance precedence data (for example, transaction data) while bit cost precedence tag is given to the bit cost precedence data (for example, backup data), and the plurality of storage units 20 are classified into a plurality of classes with service attributes and, as mentioned above, the class to which the storage unit 20 having a high speed performance pertains and the class to which the storage unit 20 with a low bit cost pertains are set in advance.

With the attribute table 64 being seen by the location means 62, the speed precedence data is located on the storage unit 20 pertaining to a high-speed-performance class and the bit cost precedence data is located on the storage unit 20 pertaining to a low-bit-cost class.

Moreover, when the system operation term reaches several years, there is a possibility that the storage unit 20 pertaining to a class set as low bit cost at the beginning of the operation departs relatively from a low bit cost condition as compared with the latest storage unit 20 added afterwards (usually, an after-developed large-capacity device becomes lower in bit unit cost). Likewise, in general, the storage unit 20 pertaining to a class set in speed performance at the beginning of the operation departs relatively from a high speed performance as compared with the latest storage unit 20 added afterwards (usually, in the case of the same-class products, an after-developed device becomes higher in performance). In order to cope with such a situation, according to this embodiment, through the use of the change means 65, the attribute value of each class in the attribute table 64 can be changed during the system operation.

Still moreover, as mentioned above in the first embodiment, the equalization behavior is adjustable in a manner such that the balance of the convergent point in the system is changed by changing the value of $\eta$ in the aforesaid equation (21). A combination of this property and the data required attribute to be given to the object data as mentioned above achieves operations, such as enabling the speed-precedence data to be located on the storage units 20 pertaining to a high-speed-performance class in the speed-precedence system balance and the bit-cost-precedence data to be located on the storage units 20 pertaining to a low-bit-cost class in the bit-cost-precedence balance. Naturally, this concept is also applicable to a case of no classification of the storage units 20.

Incidentally, although in the third embodiment the attribute table 64 is retained in the location agent 60B, it is also appropriate that, as needed, the attribute table 64 is produced by collecting the information from the control modules 21 and is mounted in the location agent 60B so that it disappears after a series of distributive location/relocation operations.

[4] Description of Fourth Embodiment

Figure 5:
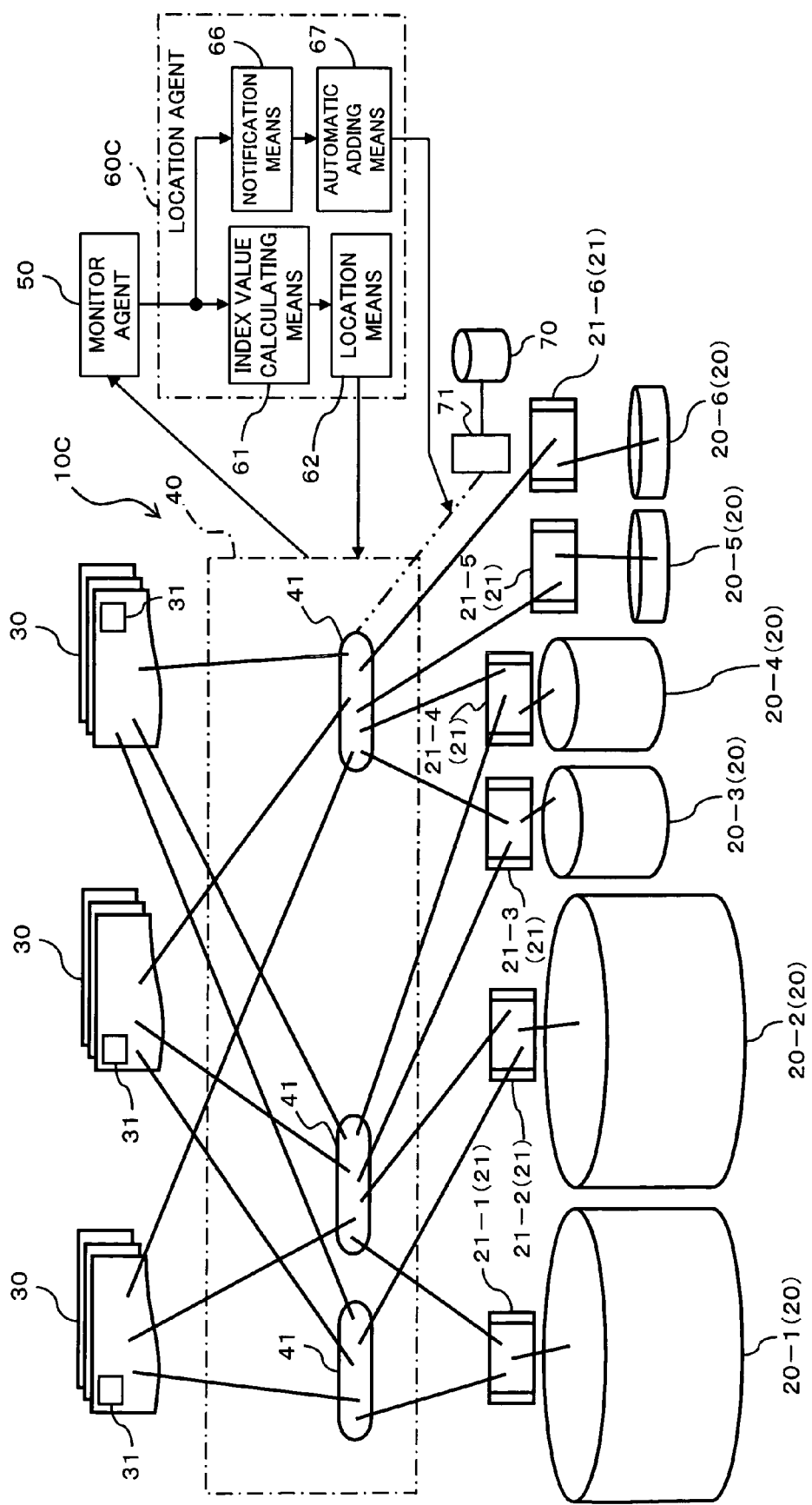
FIG. 5 is a block diagram showing a configuration of a distributed network storage system (distributed storage system) according to a fourth embodiment of the present invention.

FIG. 5 is a block diagram showing a configuration of a distributed network storage system (distributed storage system) according to a fourth embodiment of the present invention. As FIG. 5 shows, a distributed network storage system 10C according to the fourth embodiment is also configured almost similarly to the system 10 according to the first embodiment except that a spare storage unit 70 and a spare storage unit control module 71 are additionally provided therein and, in addition to an index value calculating means 61 and a location means 62 similar to those in the first embodiment, notification means 66 and automatic adding means 67 are additionally provided in the location agent 60C. In FIG. 5, the same reference numerals as those used above represent the same or almost same parts, and the description thereof will be omitted for brevity.

In this system 10C according to the fourth embodiment, the notification means 66 is for receiving the usage rate $\rho$ of the entire system monitored by the monitor agent 50 in every moment during the system operation to, when the usage rate $\rho$ exceeds a predetermined level, notify this fact to a system manager (operator or the like). Concretely, this notification means 66 is realizable by a display function or a voice outputting function of a terminal (computer or the like) constituting the location agent 60C.

Moreover, the automatic adding means 67 is for, when the notification means 66 makes the notification to the system manager, automatically adding/connecting the spare storage unit 70, prepared in advance, through the control module 71 for this spare storage unit 70 to the network 40. In this case, it is also appropriate that the automatic adding means 67 automatically adds/connects the spare storage unit 70 through the control module 71 for this spare storage unit 70 to the network 40 when the aforesaid usage rate $\rho$ exceeds a level set in advance, irrespective of the notification and instead of when the notification means 66 makes the notification to the system manager.

Figure 6:
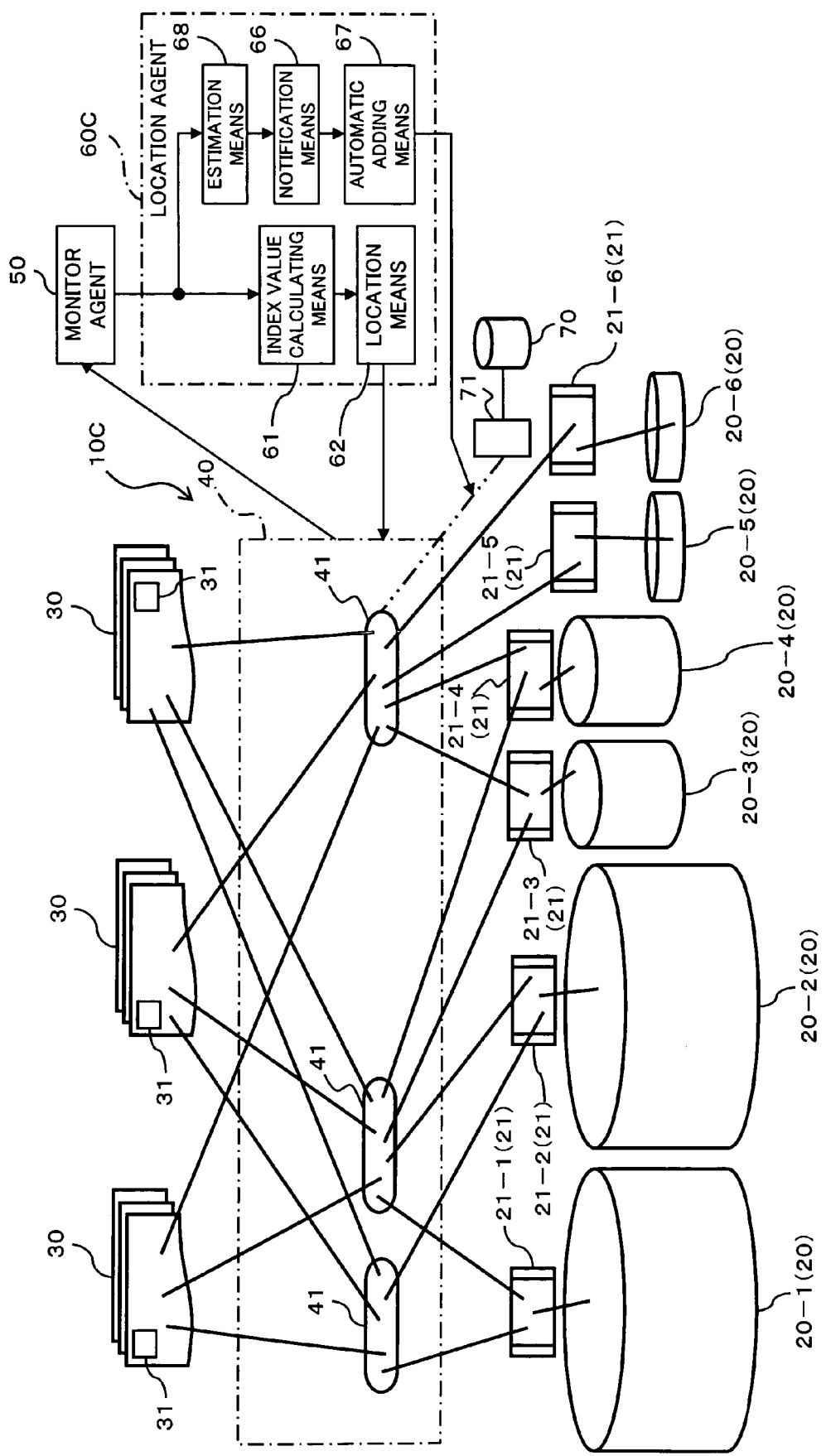
FIG. 6 is a block diagram showing a configuration of a distributed network storage system (distributed storage system) according to a modification of the fourth embodiment of the present invention.

On the other hand, FIG. 6 is a block diagram showing a modification of the configuration of a distributed network storage system (distributed storage system) according to the fourth embodiment of the present invention. As FIG. 6 shows, this modification is also configured almost similarly to the system 10C shown in FIG. 5 except that an estimation means 68 is additionally provided therein. In FIG. 6, the same reference numerals as those used above represent the same or almost same parts, and the description thereof will be omitted for brevity.

In this system 10C according to this modification, the estimation means 68 is for receiving the usage rate $\rho$ of the entire system monitored by the monitor agent 50 in every moment during the system operation to continuously monitor the history (record) thereof, thus estimating a near-future value of the usage rate $\rho$ on the basis of the history of the usage rate $\rho$. Moreover, when the near-future value estimated by the estimation means 68 exceeds a level set in advance, the notification means 66 fulfills a function to notify this fact to a system manager (operator). Still moreover, as well as that mentioned above, when the notification means 66 makes the notification to the system operator, the automatic adding means 67 carries out a function to automatically add/connect a spare storage unit 70, prepared in advance, through a control module 71 for this spare storage unit 70 to the network 40. In this case, it is also appropriate that the automatic adding means 67 automatically adds/connects the spare storage unit 70 through the control module 71 for this spare storage unit 70 to the network 40 when the aforesaid near-future value exceeds a level set in advance, irrespective of the notification and instead of when the notification means 66 makes the notification to the system manager.

With the systems 10, 10A and 10B according to the first to third embodiments, as described above, when the usage rate of the entire system is high, their stability performances improve. On the other hand, until the capacity of the entire system falls into a fully tight condition, the system manager is hardly aware of this situation.

Therefore, in the system 10C according to the fourth embodiment, by taking advantage of the fact that the utilization factor $\rho$ of the entire system is monitored as a control parameter by the monitor agent 50 at all times, through the use of the display function or the voice outputting function of the terminal (computer or the like) constituting the location agent 60C, it is possible to properly notify, to the system manager, the present situation that the usage rate $\rho$ or the near-future value of the usage rate $\rho$ exceeds a level set in advance. Upon receipt of this notification, the system manager can quickly cope with this situation.

In addition, as mentioned above, the current social requirement about a large-scale network storage system is strict, such as guaranteeing one-year, 365-days, 24-hours continuous operation. According to the conventional systems, in order to meet this requirement, there is a need for the system manager to continuously monitor the system situation while giving up the holidays. On the other hand, with the system 10C according to the fourth embodiment, as mentioned above, the reservation storage unit 70 with a proper size and the control module 71 are placed into a stand-by condition and, at a critical situation (in this case, when the usage rate $\rho$ or the near-future value of the usage rate $\rho$ exceeds a predetermined level), the automatic adding means 67 automatically adds the storage unit 70 and the control module 71 to the system 10C and activates them therein. Thus, the system manager can enjoy the holidays at ease. Immediately after the new storage unit 70 and control module 71 are added in this way, the standard data relocation function works so that the system 10C is again placed into a stable state.

[5] Description of Fifth Embodiment

Figure 7:
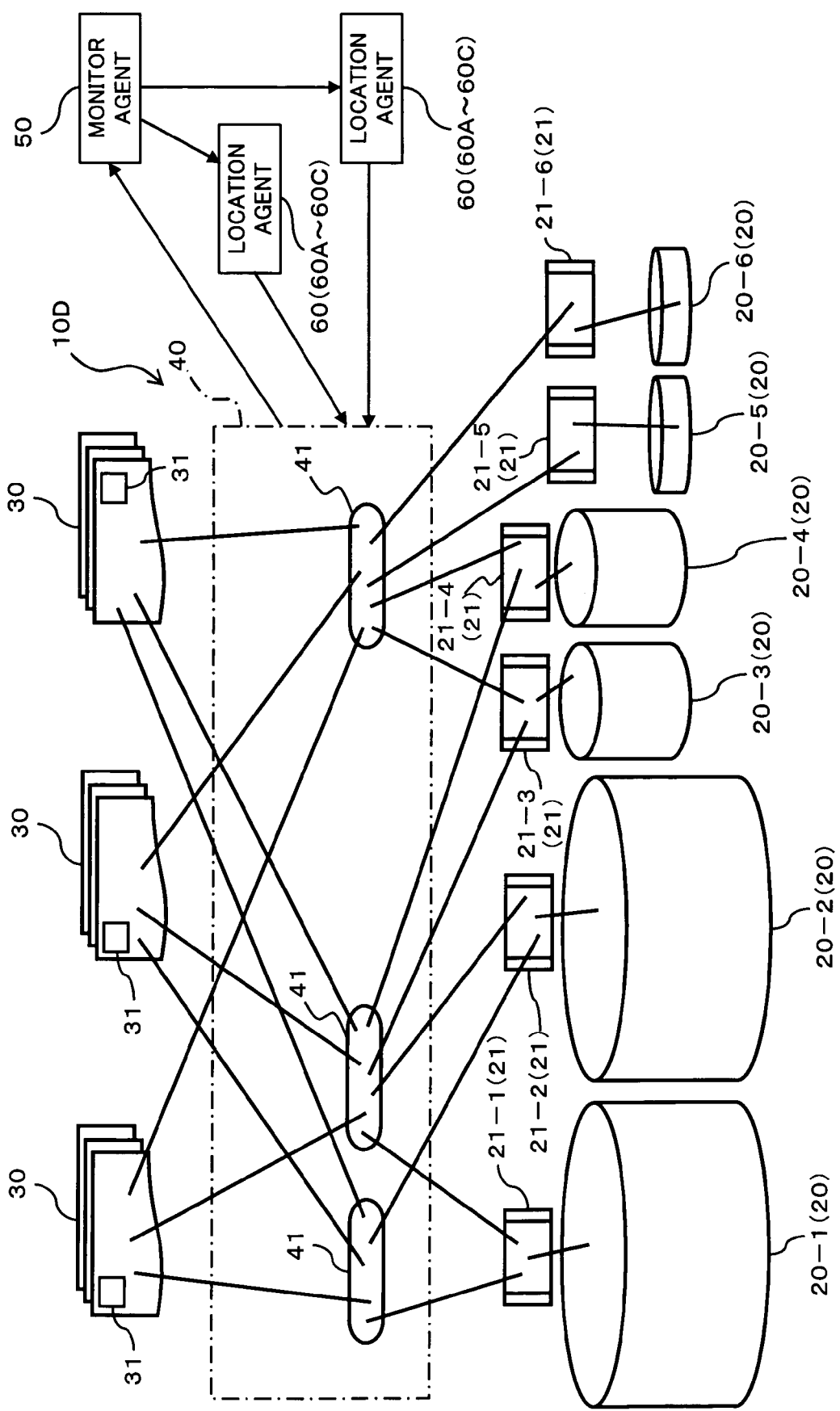
FIG. 7 is a block diagram showing a configuration of a distributed network storage system (distributed storage system) according to a fifth embodiment of the present invention.

FIG. 7 is a block diagram showing a configuration of a distributed network storage system (distributed storage system) according to a fifth embodiment of the present invention. As FIG. 7 shows, a distributed network storage system 10D according to the fifth embodiment is also configured almost similarly to the systems 10, 10A, 10B and 10C according to the first to fourth embodiments except that two or more location agents 60 (60A, 60B, 60C) are provided, although only one is provided in the first to fourth embodiments. In FIG. 7, the same reference numerals as those used above represent the same or almost same parts, and the description thereof will be omitted for brevity.

In particular, in the system 10D according to the fifth embodiment shown in FIG. 7, the monitor agent 50 and two location agents 60 (60A, 60B, 60C), which have been described in the first to fourth embodiments, are provided, and each of the location agents 60 (60A, 60B, 60C) is made to operate in accordance with a result of the monitor by the monitor agent 50. That is, pairs of the aforesaid index value calculating means 61 and location means 62 are mounted in the system 10D according to the fifth embodiment, and the plural pairs independently carry out the index value calculating function and the distributive location/relocation function.

In the case of the employment of an index value calculation method in which two location agents 60 (60A, 60B, 60C) are provided and different from each other, it is considered that the system 10D cannot stop the data movement even if reaching a given final state.

However, if the following method is employed, the system 10D can stop the data movement simultaneously with reaching a given final state, thereby achieving an extremely stable operation. That is, first, one (first) of the two location agents 60 (60A, 60B, 60C) optimally distributes the resource utilization mode of the entire system on the basis of the totalization without discriminating the logical storage areas. The other (second) location agent then performs the data interchange operation (relocation operation) on the basis of the totalization while discriminating the logical storage areas to equalize the resource utilization modes with each logical storage area.

The employment of this method can provide the following two merits. The first is that, in a system situation in which the resource utilization modes of the entire system are speedily distributed in an optimal condition, the operation of the second location agent can be temporarily stopped (or conducted slowly) to speedily optimally distribute the resource utilization modes of the entire system. Moreover, after the optical distribution of the resource utilization modes of the entire system, the operation of the second location agent can be returned to the normal state. The second is that, as the operation states of the system 10D, the operation speeds of the first and second location agent can separately be set, thus providing new freedom on the setting.

[6] Description of Evaluation Value (System Stability/System Tightness) Related to Stable Operation of System In the first to fifth embodiments, with respect to the distributed storage systems 10 and 10A to 10D each composed of a plurality of storage units 20 including a unit different in maximum available total capacity from the others, the realizing methods have been disclosed which carry out the efficient and stable operation control on each of the systems 10, 10A to 10D.

In particular, in the modification of the fourth embodiment, through the use of the monitor agent 50 for monitoring the present resource using situation (particularly, the usage rate $\rho$ of the entire system) of the system 10C and the estimation means 68 for estimating the near-future value of the resource using situation (particularly, the entire usage rate $\rho$) of the system 10C on the basis of the monitor result (plus past history), the storage system 10C can stably be operated immediately before reaching the vicinity of a using limit state.

However, this stable operation immediately before reaching the vicinity of the using limit state can create a problem in that the system manager is not aware of the tightness of the system capacity until reaching a state immediately before the limit.

The present usage rate $\rho$ of the entire system is only the present usage rate literally and the value obtained by the estimation of the near-future usage rate $\rho$ based on the present usage rate $\rho$ and the history of the past usage rate $\rho$ is only a usage rate $\rho$ in the near future based on the extrapolation. Accordingly, at present, difficulty is encountered in objectively making a decision as to security/no security of the system, i.e., the relationship between the usage rate and the stability of the system.

For this reason, in the sixth to ninth embodiments of the present invention, an evaluation (degree of system stability/degree of system tightness) related to the stable system operation is employed. That is, in the embodiments which will be described later, there is provided a means "a decision unit (evaluation value calculating means) 81 which will be described later" which calculates the aforesaid evaluation value on the basis of the present system resource using situation (system information including the information on total volume of data stored in each of the storage units 20 or in stored in all the storage units 20 or on the residual available capacity) monitored by the monitor agent 50 and makes a "decision on the feasibility of the M-th (later) recovery operation".

In this case, the "recovery operation" signifies an operation for, when a trouble occurs in a storage node so that data is lost, recovering the lost data on the basis of the information on a redundant pair (in the case of the triple or more, one member of a redundant group) of the lost data. In general, the recovery operation is one of the system operations and is conducted in a site (in the embodiment, a trouble recovering means 92 which will be described later) which cannot be seen from a general user. However, to the system manager, both the occurrence of the node trouble and feasibility of the recovery operation are important system information and are of types to be noted at all times.

According to the present invention, as described above, there is provided the means of "making a decision on the feasibility of the M-th (later) recovery operation", that is, the means of "making a decision on the feasibility of the M-th recovery operation when, for example, the recovery operations up to (M−1)-th turn out a success". A detailed description will be given hereinafter of the methodology of this means (method of calculating the degree of system stability/ the degree of system tightness serving as an evaluation value).

[6-1] Description of Signs (Symbols)

With respect to a node whose working capacity is the largest (tightest node), the working capacity is expressed as $U_a$ and the residual quantity is expressed as $R_a$. Moreover, with respect to a node whose working capacity is the second-largest, the working capacity is expressed as $U_b$ and the residual quantity is expressed as $R_b$, and with respect to a node whose working capacity is the third-largest, the working capacity is taken as $U_c$ and the residual quantity is taken as $R_c$. Still moreover, the total residual quantity (the sum total of residual capacities) of the system is taken as $R_t$ and the total working capacity (the sum total of working capacities) is taken as $U_t$. Incidentally, when needed, with respect to a node whose working capacity is the fourth-largest and the nodes smaller in working capacity, and the working capacities are expressed as $U_d$, $U_e$, . . . , and the residual capacities are expressed as $R_d$, $R_e$, . . . .

[6-2] About Feasibility (Tightness Index on Recovery Operation) of First Recovery Operation A description will be given hereinbelow of the feasibility (tightness index on a recovery operation) of the first recovery operation with respect to a given node. In this case, the working capacity of the node to be recovered is taken as $U_i$ and the residual capacity of the same node is taken as $R_i$.

In a case in which the node to be recovered belongs to a double redundancy system, the node (surviving one) of the mirror pair is copied and the corresponding copying node (evacuation destination, node for evacuation) can be "a node different from the copied node". The node itself to be recovered cannot become the copy destination. At this time, the destination (residual capacity) of the evacuation node is given by the following equation (25).

[destination (residual capacity) of evacuation node]
$$=R_t-(R_i+R_s) \quad (25)$$

where $R_s$ represents a residual capacity of the copied node.

In a case in which the node to be recovered belongs to a triple-or-more redundancy system, one node (surviving one) of the mirror group is set at a copied node and the corresponding copying node must be "a node in which no member of the mirror group is mounted". The node itself to be recovered cannot become the copy destination. At this time, the destination (residual capacity) of the evacuation node is given by the following equation (26).

[destination (residual capacity) of evacuation node]
$$=R_t-(R_i+\Sigma R_j) \quad (26)$$

where $\Sigma R_j$ represents a total residual capacity of the node in which a member of the mirror group exists.

In a case in which the node to be recovered belongs to an N-combined redundancy system, the number of surviving members of the mirror group (number of members of the mirror group to be examined) is (N−1), and the node "which should not be copied" is interchanged with each node. Assuming that the recovery operations are to be conducted in order (all the recovery operations are not conducted simultaneously (in a moment)), the recovery operation of the node, operated lastly, takes place at the time that the system residual capacity becomes at minimum, which creates a problem as to whether or not the evacuation of the node (most critical node) to be operated is possible. That is, the problem is whether or not the following equation (27) holds as mentioned later. Naturally, the node itself to be recovered cannot become a copy destination.

[destination (residual capacity) of most critical node]

$$= R_t - \{R_i + (U_i - 1)\} - \sum_{j=1}^{N-1} R_j \geq 1 \quad (27)$$

In the case of discussing the stability of the system considering the worst case (deviating from the necessary sufficient condition), in the right side of the aforesaid inequality (27), also in a combination in which $$\sum_{j=1}^{N-1} R_j$$

becomes $$\max\left(\sum_{j=1}^{N-1} R_j\right),$$

if the aforesaid inequality (27) turns out satisfaction, it is considered that the system is stable. Therefore, the following equation (28) is given by arranging the aforesaid inequality (27).

$$R_t - \left\{R_i + \max_{j \neq i}\left(\sum_{j=1}^{N-1} R_j\right)\right\} \geq U_i \quad (28)$$

In a case in which the aforesaid inequality reaches satisfaction, the system is stable. The aforesaid inequality (28) can equally be expressed as follows.

$$\frac{U_i}{R_t - \left\{R_i + \max_{j \neq i}\left(\sum_{j=1}^{N-1} R_j\right)\right\}} \leq 1 \quad (29)$$

In the following description, the right side of this equation (29) is referred to as "tightness index for a recovery operation (of one node)". When the aforesaid inequality (29) turns out satisfaction, the recovery operation on the node i reaches a success.

[6-3] System Tightness: Primary (Most-Tightness Node Searching Method)

When the node whose using quantity is the largest (tightest node) becomes an object of recovery, the condition to the success of the recovery operation is satisfying the inequality (i=a in the aforesaid equation (29)) expressed by the following equation (30), and the system residual quantity $R_t^{(a)}$ after the recovery operation turns out a success is given by the following equation (31).

Tightness index of recovery operation $$\rightarrow \frac{U_a}{R_t - \left\{ R_a + \max_{j \neq a}\left(\sum_{j=1}^{N-1} R_j\right)\right\}} \leq 1 \quad (30)$$

Residual capacity after success of recovery $$\rightarrow R_t^{(a)} = R_t - (R_a + U_a) \quad (31)$$

When the node whose using quantity is the second-largest (second-most working capacity node) becomes an object of recovery, the condition to the success of the recovery operation is the satisfaction of the inequality (i=b in the aforesaid equation (29)) expressed by the following equation (32), and the system residual quantity $R_t^{(b)}$ after the recovery operation turns out a success is given by the following equation (33).

Tightness index of recovery operation $$\rightarrow \frac{U_b}{R_t - \left\{ R_b + \max_{j \neq b}\left(\sum_{j=1}^{N-1} R_j\right)\right\}} \leq 1 \quad (32)$$

Residual capacity after the success of recovery $$\rightarrow R_t^{(b)} = R_t - (R_b + U_b) \quad (33)$$

In comparison between the aforesaid equation (30) and the aforesaid equation (32), for example, the left side of the aforesaid equation (30)>the left side of the aforesaid equation (32) as expressed by the following equation (34).

$$\frac{U_a}{R_t - \left\{ R_a + \max_{j \neq a}\left(\sum_{j=1}^{N-1} R_j\right)\right\}} > \frac{U_b}{R_t - \left\{ R_b + \max_{j \neq b}\left(\sum_{j=1}^{N-1} R_j\right)\right\}} \quad (34)$$

In this case, in the left side of the aforesaid equation (34), if $R_b$ is included in a combination of $$\max_{j \neq a}\left(\sum_{j=1}^{N-1} R_j\right),$$

the following equality is true.

$$R_b + \max_{j \neq b}\left(\sum_{j=1}^{N-1} R_j\right) = \max\left(\sum_{j=1}^{N} R_j\right)$$

Likewise, in the right side of the aforesaid equation (34), if $R_a$ is included in a combination of $$\max_{j \neq b}\left(\sum_{j=1}^{N-1} R_j\right),$$

the following equality is true.

$$R_a + \max_{j \neq a}\left(\sum_{j=1}^{N-1} R_j\right) = \max\left(\sum_{j=1}^{N} R_j\right)$$

Therefore, in a case in which both $R_a$ and $R_b$ are "included" (=both the residual capacities $R_a$ and $R_b$ are relatively large), it is seen that the aforesaid equation (34) becomes equivalent to the following equation (35). Incidentally, in a case in which the data relocation facility (one of the functions of the above-mentioned location means 62) based upon the node usage rate equalization operates correctly, both the residual capacities $R_a$ and $R_b$ become relatively large.

$$U_a > U_b \quad (35)$$

From the definitions of the subscripts a and b in the aforesaid item [6-1], the aforesaid equation (35) should come into satisfaction, thus forming a self-evident equation.

Except for the above-mentioned special cases, difficulty is experienced in further simplifying the equation (34).

That is, in a case in which the aforesaid equation (35)(=a self-evident equation from the definition of the subscripts) or the aforesaid equation (34)(which is not a self-evident equation) becomes true, the recovery operation to be conducted when the tightest node (subscript a) is an object of recovery is more critical than the recovery operation to be conducted when the second-largest working capacity node (subscript b) is an object of the recovery.

As the search of the "tightest node", the node I which gives the maximum value according to the following equation (36) is searched with reference to the aforesaid equation (34) which is not self-evident.

$$\max\left( U_i \middle/ \left[ R_t - \left\{ R_i + \max_{j \neq i}\left(\sum_{j=1}^{N-1} R_j\right)\right\}\right]\right) \quad (36)$$

Alternatively, anode which gives a working capacity according to the following equation (37)(that is, of a plurality of nodes, a node whose working capacity (stored data volume) is at maximum (the largest)) is searched with reference to the aforesaid equation (35) which is further simplified (self-evident).

$$U_a = \max (U_j) \quad (37)$$

In a case in which one huge node and numerous small nodes exist in the system, even if the huge node is in an almost free condition, there is a high possibility that the huge node becomes the "tightest node", for that, when the huge node becomes an object of recovery, difficulty is experienced in utilizing the huge residual capacity of the huge node itself. The meaning that $R_t$ exists as a subtraction factor in the denominator of the index based on the aforesaid equation (34) is as mentioned above.

In most cases, a large-scale storage system is used on the condition that the following equation (38) reaches satisfaction (that is, N is sufficiently small and $R_t \gg R_i$ && $R_t \gg R_j$). Therefore, in most cases, the node i, which meets this condition, agrees with the node j which gives max $(U_j)$. That is, usually, the inequality relationship of the aforesaid equation (34) and the inequality relationship of the aforesaid equation (35) agree with each other. Moreover, even if the index of the aforesaid equation (35) simplified is put to use, the tightest node is correctly searched in most cases.

$$\left\{ R_t - \max_{j \neq i}\left(\sum_{j=1}^{N-1} R_j\right) - R_i \right\} \approx R_t \quad (38)$$

[6-4] System Tightness: Secondary

In the following description, unless otherwise specified particularly, the discussion is made under the condition of $R_t \gg R_i$. Moreover, on and after this, the data relocation facility based on the node working capacity equalization is employed through the use of a default (unless otherwise specified particularly).

(A) A case in which the most using quantity node becomes an object of recovery and the second-most using quantity node then becomes an object of recovery.

In a case in which the most using quantity node (tightest node) becomes an object of recovery, the system residual capacity $R_t^{(a)}$ after the recovery operation turns out a success is given by the aforesaid equation (31) and, subsequently, the working capacity $U_b^{(a)}$ of the second-most using quantity node (node second in using quantity thereto) after the data relocation is given by the following equation (39).

$U_b$ after the recovery and the relocation $$\rightarrow U_b^{(a)} = U_b + \left(\frac{U_b}{U_t}\right) U_a \quad (39)$$

Furthermore, the condition to the success of the recovery operation when the second-most using quantity node becomes an object of recovery is to meet the inequality expressed by the following equation (40), and the system residual capacity $R_t^{(ab)}$ after the success of the recovery operation is given by the following equation (41).

Tightness index of recovery operation $$\rightarrow \frac{U_b^{(a)}}{R_t^{(a)} - \left\{R_b^{(a)} + \max_{j \neq a,b}\left(\sum_{j=1}^{N-1} R_j^{(a)}\right)\right\}} \leq 1 \quad (40)$$

System residual capacity after recovery $$\rightarrow R_t^{(ab)} = R_t - (R_a + U_a) - (R_b^{(a)} + U_b^{(a)}) \quad (41)$$

(B) A case in which the second-most using quantity node becomes an object of recovery and the most using quantity node then becomes an object of recovery.

In a case in which the second-most using quantity node becomes an object of recovery, the system residual capacity $R_t^{(b)}$ after the recovery operation turns out a success is given by the aforesaid equation (33) and, subsequently, the working capacity $U_a^{(b)}$ of the most using quantity node after the data relocation is given by the following equation (42).

$U_a$ after the recovery and the relocation $$\rightarrow U_a^{(b)} = U_a + \left(\frac{U_a}{U_t}\right) U_b \quad (42)$$

Furthermore, the condition to the success of the recovery operation when the most using quantity node becomes an object of recovery is to meet the inequality expressed by the following equation (43), and the system residual capacity $R_t^{(ba)}$ after the success of the recovery operation is given by the following equation (44).

Tightness index of recovery operation $$\rightarrow \frac{U_a^{(b)}}{R_t^{(b)} - \left\{R_a^{(b)} + \max_{j \neq a,b}\left(\sum_{j=1}^{N-1} R_j^{(b)}\right)\right\}} \leq 1 \quad (43)$$

System residual capacity after recovery $$\rightarrow R_t^{(ba)} = R_t - (R_b + U_b) - (R_a^{(b)} + U_a^{(b)}) \quad (44)$$

From the aforesaid equations (39) and (42), it is easily found that the following equations (45) and (46) hold.

$$R_b^{(a)} = R_b - \left(\frac{U_b}{U_t}\right) U_a \quad (45)$$

$$R_a^{(b)} = R_a - \left(\frac{U_a}{U_t}\right) U_b \quad (46)$$

From these equations (45) and (46), it is easily found that, in generally, the following equation (47) holds.

$$R_j^{(k)} = R_j - \left(\frac{U_j}{U_t}\right) U_k \quad (47)$$

Moreover, the following equation (48) easily holds.

$$R_j + U_j = R_j^{(k)} + U_j^{(k)} \quad (48)$$

This indicates that the right sides of the aforesaid equations (41) and (42) are equal in value to each other.

That is, it is seen that, when the recovery operation has turned out a success several times (failure→recovery), the past recovery history (that is, which of nodes have become an object of recovery and have been recovered in what order) exerts no influence on the feasibility of the next and subsequent recovery operations.

Furthermore, the comparison between the aforesaid equations (40) and (43) is made, subject to $U_a > U_b$. From the aforesaid equations (31), (33), (39), (42) and others, the left side of the aforesaid equation (40) is transformed as expressed by the following equation (49), and the left side of the aforesaid equation (43) is transformed as expressed by the following equation (50).

$$\frac{U_b^{(a)}}{R_t^{(a)} - \left\{R_b^{(a)} + \max_{j \neq a,b}\left(\sum_{j=1}^{N-1} R_j^{(a)}\right)\right\}} = \frac{U_b + \frac{U_a U_b}{U_t}}{R_t - \left\{(R_a + U_a) + R_b - \frac{U_a U_b}{U_t} + \max_{j \neq a,b}\left(\sum_{j=1}^{N-1}\left[R_j - \frac{U_a U_j}{U_t}\right]\right)\right\}} \quad (49)$$

-continued $$\frac{U_a^{(b)}}{R_t^{(b)} - \left\{R_a^{(b)} + \max_{j \neq a,b}\left(\sum_{j=1}^{N-1} R_j^{(b)}\right)\right\}} = \frac{U_a + \frac{U_a U_b}{U_t}}{R_t - \left\{(R_b + U_b) + R_a - \frac{U_a U_b}{U_t} + \max_{j \neq a,b}\left(\sum_{j=1}^{N-1}\left[R_j - \frac{U_b U_j}{U_t}\right]\right)\right\}} \quad (50)$$

The aforesaid calculations indicates the relationship shown in the following table 1.

TABLE 1

|  | Left Side of Equation (40) |  | Left Side of Equation (43) |
| --- | --- | --- | --- |
| Numerator | $U_b$ + Common Factor | (<) | $U_a$ + Common Factor |
| Denominator | Common Factor − $U_a\{1 - (\Sigma U_j)/U_t\}$ | (<) | Common Factor − $U_b\{1 - (\Sigma U_j)/U_t\}$ |

When the common factor of the numerator in the right side of the aforesaid equation (49) or (50) is taken as $C_n$ and the common factor of the denominator therein is taken as $C_d$ and the equation is arranged, for example, the left side of the equation (40)>the left side of the equation (43) is expressed by the following equation (51). However, an operation for dividing both the sides by $(U_a-U_b)>0$ is conducted once.

$$\frac{C_n + U_b}{C_d - U_a\{1 - (\sum U_j)/U_t\}} > \frac{C_n + U_a}{C_d - U_b\{1 - (\sum U_j)/U_t\}} \quad (51)$$

is equivalent to $$(C_n + U_a + U_b)\left(1 - \frac{\sum U_j}{U_t}\right) > C_d$$

When the common factors are returned, the left side of the equation (40)>the left side of the equation (43) becomes equivalent to the following equation (52).

$$\left(U_a + U_b + \frac{U_a U_b}{U_t}\right)\left(1 - \frac{\sum U_j}{U_t}\right) > \quad (52)$$

$$R_t - \left\{R_a + R_b + \max_{j \neq a,b}\left(\sum_{j=1}^{N-1} R_j\right)\right\} + \frac{U_a U_b}{U_t}$$

is equivalent to $$(U_a + U_b) - \left(U_a + U_b + \frac{U_a U_b}{U_t}\right)\frac{\sum U_j}{U_t} >$$

$$R_t - \left\{R_a + R_b + \max_{j \neq a,b}\left(\sum_{j=1}^{N-1} R_j\right)\right\}$$

When the aforesaid equation (52) holds, it is necessary that the following equation (53) also holds where the second term in the left side, standing at a negative value, is omitted therefrom.

$$(U_a + U_b) > R_t - \left\{(R_a + R_b) + \max_{j \neq a,b}\left(\sum_{j=1}^{N-1} R_j\right)\right\} \quad (53)$$

However, the aforesaid equations (53) and (28) are contradictory to each other. That is, considering "virtually" a huge node obtained by putting the node a and the node b together, a difference exists in direction of sign of inequality between the aforesaid equation (53) and the aforesaid equation (28). Accordingly, assuming that the equation (53) holds, it is found that the recovery operation on the node to be finally operated through the node a and the node b comes into failure.

Since the system becomes unstable when the aforesaid equation (52) holds, for the stabilization of the system, there is a need to satisfy the left side of the equation (40)≦the left side of the equation (43). That is, it is found that, when the system is in a stable state, the index according to the equation (43) is more critical than the index according to the equation (40). In other words, when the most using quantity node (tightest node) next becomes an object of recovery, the second recovery operation becomes more critical.

By arranging the condition to the satisfaction of the aforesaid equation (43) found to be more critical, the following equation (54) is obtainable.

$$U_a + \frac{U_a U_b}{U_t} \leq \quad (54)$$

$$R_t - \left\{R_a + R_b + \max_{j \neq a,b}\left(\sum_{j=1}^{N-1} R_j\right)\right\} - U_b + \frac{U_a U_b}{U_t} + \frac{U_b}{U_t}\left(\sum U_j\right)$$

$$U_a + U_b - \frac{U_b}{U_t}\left(\sum U_j\right) \leq R_t - \left\{R_a + R_b + \max_{j \neq a,b}\left(\sum_{j=1}^{N-1} R_j\right)\right\}$$

If the following equation (55) holds, the aforesaid equation (54) always holds. Therefore, it can sufficiently be considered that the feasibility of the recovery operation is checked by verifying the following equation (55) obtained by simplifying the aforesaid equation (54).

$$U_a + U_b \leq R_t - \left\{R_a + R_b + \max_{j \neq a,b}\left(\sum_{j=1}^{N-1} R_j\right)\right\} \quad (55)$$

Meanwhile, as well as that described immediately after the aforesaid equation (53), the aforesaid equation (55) is not different from the aforesaid equation (28) defined relative to a "virtual" huge single bode obtained by putting the node a and the node b together. That is, the aforesaid equation (54) only provides a slightly higher strict decision condition as compared with the aforesaid equation (55) obtained according to a very simple concept.

[6-5] System Tightness: M-th Order

Consideration is given to an event in which the M-th recovery operation is conducted on the tightest node (subscript a). As the object of the recovery operation up to (M−1)-th, the nodes can simply be recovered in the order of decreasing node individual total capacity $T_i$ (=$R_i+U_i$)(assuming a success).

First of all, the recovery operation starts at the search of the tightest node. At this time, the node is searched which gives the working capacity according to the aforesaid equation (37)

(that is, searching, of a plurality of nodes, a node whose working capacity (stored data volume) is at maximum). Assuming that the data relocation facility based on the node usage rate equalization operates correctly, the aforesaid equation (37) sufficiently works for the search of the tightest node. However, with a more detailed procedure, a node i is searched which gives the maximum value according to the aforesaid equation (36).

The nodes other than the tightest node (subscript a) are sorted in the order of decreasing total capacity $T_i$, and the (M−1) high-order nodes are marked.

Following this, the remaining nodes are sorted in the order of decreasing residual capacity $R_j$, and the (N−1) high-order nodes are marked in accordance with the system redundancy N.

In addition, through the use of the following equation (56) or (57), a decision is made as to the feasibility of the M-th recovery operation. According to a simplified procedure, the following inequality (56) is evaluated which is given by extending and arranging the aforesaid equation (55). If this inequality (56) holds, the M-th recovery operation reaches a success without fail.

$$R_t \geq (R_a + U_a) + \sum_{i=1}^{M-1}(R_i + U_i) + \sum_{j=1}^{N-1} R_j \qquad (56)$$

According to a more detailed procedure, the following inequality (57) is evaluated which is obtained by extending and arranging the aforesaid equation (54). If this inequality (57) holds, the M-th recovery operation reaches a success without fail.

$$R_t \geq (R_a + U_a) + \sum_{i=1}^{M-1}(R_i + U_i) + \sum_{j=1}^{N-1} R_j - \frac{\left(\sum_{i=1}^{M-1} U_i\right)}{U_t}\sum_{j=1}^{N-1} U_j \qquad (57)$$

[6-6] Conclusion

As described later, the decision unit 81 (see FIGS. 8 to 12) according to this embodiment functions as an evaluation value calculating means to an evaluation value (system stability degree/system tightness degree), related to the stable operation of this system including a plurality of storage units (nodes) 20, on the basis of the system information including a result of the monitor by the monitor agent 50.

When one of the plurality of storage units 20 loses data due to the occurrence of a trouble, this evaluation value calculating means calculates, as an evaluation value (system stability degree/system tightness degree), the executable number M of times of recovery operation for recovering the lost data on the basis of the system information including a result of the monitor by the monitor agent 50.

At this time, this evaluation calculate calculating means successively makes a decision as to the feasibility of the "first recovery operation", "second recovery operation" . . . , and carries out the decision on the feasibility until the decision shows that the recovery falls into a failure. In this case, in the M-th (M=1, 2, . . . ) feasibility decision processing, the evaluation value calculating means implements the following three-stage processing: that is, (a) the search processing of searching, of the plurality of storage units 20, the storage unit (tightest node) whose working capacity is the largest, on the basis of the system information including the result of the monitor by the monitor agent 50;

(b) the sort processing (ranking processing) of sorting the storage units 20 other than the tightest node searched in the aforesaid search processing (a) according to the total capacities $T_i$ and residual capacities $R_i$ of the storage units 20 on the basis of the system information including the result of the monitor by the monitor agent 50 for extracting the M−1 high-order storage units 20 according to the total capacity $T_i$ and further for extracting the N−1 high-order (N denotes the redundancy of this system) storage units 20 according to the residual capacity $R_i$; and (c) the decision processing (inequality evaluation processing) of making a decision on the feasibility of the M-th recovery operation on the basis of a result of the sorting by the sort processing (b).

The search processing (a) searches a node which gives the working capacity according to the aforesaid equation (37) (that is, seeking, of the plurality of nodes, the node whose working capacity (stored data volume) is at maximum). As mentioned above, assuming that the data relocation facility based on the node usage rate equalization operates correctly, the aforesaid equation (37) works sufficiently for the search of the tightest node. Moreover, as mentioned above, the more detailed procedure searches the node i which provides the maximum value according to the aforesaid equation (36). Incidentally, in the search processing (a), there is conducted the aforesaid search or search regarded as being substantially equivalent to the aforesaid search.

In the aforesaid sort processing (b), the nodes other than the tightest node (subscript a) are sorted in the order of decreasing total capacity $T_i$ and (M−1) high-order nodes are marked, and the remaining nodes are sorted in the order of decreasing residual capacity $R_j$ and the (N−1) high-order nodes are marked in accordance with the redundancy N of the system.

In addition, in the aforesaid decision processing (c), through the use of the aforesaid equation (56) or (57), a decision is made on the feasibility of the M-th recovery operation. In the simplified procedure, there is evaluated the aforesaid inequality (56) obtained by extending and arranging the aforesaid equation (55). If this inequality (56) holds, the M-th recovery operation turns out a success without fail. According to the more detailed (stricter) procedure, there is evaluated the aforesaid inequality (57) obtained by extending and arranging the aforesaid equation (54).

The utilization of the above-mentioned means enables constructing a method for the stable operation of the distributed storage system as follows.

That is, the aforesaid evaluation value calculating means successively carries out the decision on the feasibility of the first recovery operation, the decision on the feasibility of the first recovery operation, . . . and, when the decision shows that the recovery operation turns out a success, implements the decision processing on the feasibility of the next recovery operation and, when the decision in the M-th recovery operation feasibility decision processing indicates the success of the recovery operation while the decision in the (M+1)-th recovery operation feasibility decision processing indicates the failure of the recovery operation, calculates the "M" as the executable number of times of recovery operation. The degree of system stability at this time is referred to as "M-order stability".

Furthermore, according to this embodiment, as mentioned later, the degree M of system stability calculated is notified to a system manager or a decision is made on the degree M of system stability through the function of a decision unit 81 serving as a comparison means (mentioned later) and, when the decision result shows that the degree M of system stability becomes below a predetermined value, the decision result is notified to the system manager or a measure, such as the storage node extension, is taken so that the degree M of system stability exceeds the aforesaid value, thereby enabling the efficient and truly stable operation of this system.

[7] Description of Sixth Embodiment

Figure 8:
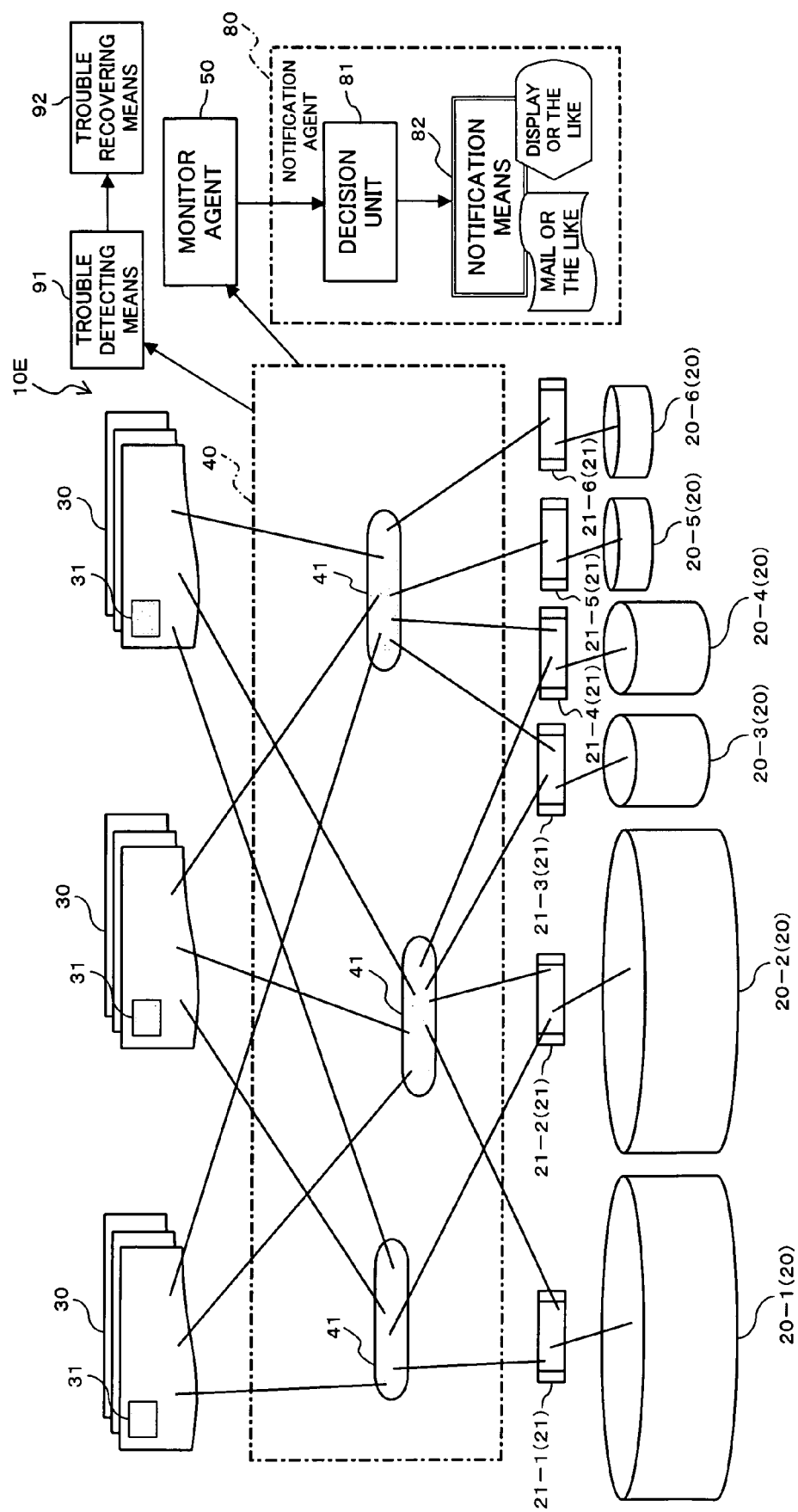
FIG. 8 is a block diagram showing a configuration of a distributed network storage system (distributed storage system) according to a sixth embodiment of the present invention.

FIG. 8 is a block diagram showing a configuration of a distributed network storage system (distributed storage system) according to the sixth embodiment of the present invention. As FIG. 8 shows, a distributed network storage system 10E according to the sixth embodiment is also configured almost similarly to the system 10 according to the first embodiment except that a notification agent 80 is provided in place of the location agent 60 in the first embodiment and a trouble detecting means 91 and a trouble recovering means 92 are newly added thereto. In FIG. 8, the same reference numerals as those used above represent the same or almost same parts, and the description thereof will be omitted for brevity.

In this configuration, the trouble detecting means 91 is for detecting the occurrence of a trouble of each of the storage units (nodes) 20 included in this system 10E. The trouble recovering means 92, in a case in which the occurrence of a trouble is detected by the trouble detecting means 91 and data is lost in the trouble occurrence storage unit (node) 20, carries out a recovery operation for the recovery of the lost data on the basis of the information on the redundant pair (in the case of the triple or more, one member of a redundant group) of the lost data.

In addition, the notification agent 80 is composed of a decision unit 81 and a notification means 82.

The decision unit 81 functions as an evaluation value calculating means to calculate an evaluation value (degree of system stability, executable number of times of recovery operation) M related to the stable operation of this system 10E according to the method mentioned above in the item [6] on the basis of the system information including the result of the monitor by the monitor agent 50 (information on a total volume of data stored in each of the storage units 20 or in all the storage units 20, or information on a residual available capacity), and further has a function to operate the notification means 82. Moreover, it is also appropriate that the decision means 81 is designed to function as a comparison means (first comparison means) to make a comparison between the calculated evaluation value M and a threshold (first threshold) set in advance. In this case, the decision unit 81 operates the notification means 82 in accordance with a result of the comparison therebetween.

The notification means 82 is under control of the decision unit 81 and is for making the notification to a system manager and operates to notify a situation corresponding to the aforesaid evaluation value M through the use of some means. Concretely, for example, the notification means 82 conducts the following operations (i-1) and (i-2).

(i-1) For the notification to the system manager, the notification means 82 displays the evaluation value M, calculated by the decision unit 81 (functioning as an evaluation value calculating means), on a monitor screen for the management of this system 10E at all times.

(i-2) For the notification to the system manager, when needed (for example, when the evaluation value M calculated by the decision unit 81 meets a predetermined condition), the notification means 82 transmits an electronic mail or the like indicative of this fact to a specific mail address or sends a signal representative of this fact to a specified unit (physical unit; for example, portable terminal, or the like). The condition decision based on the aforesaid predetermined condition is made by the aforesaid function of the comparison means of the decision unit 81 and, concretely, the decision unit 81 makes the notification means 82 conduct the notification operation to the system manager.

In addition, in this embodiment, the monitor agent (monitor means) 50 monitors the state (system information) of this system 10E according to at least one of the following methods (ii-1) to (ii-4).

(ii-1) When receiving a report from each of the control modules 21, the monitor agent 50 monitors the system information.

ii-2) The monitor agent 50 monitors the system information by making reference to an operation record (log) of each of the (control modules 21.

(ii-3) The monitor agent 50 monitors the system information by directly and actually investigating the using state of each of the storage units 20 or all the storage units 20.

(ii-4) The monitor agent 50 monitors the system information by successively reading out the using states of the storage units 20, collected and preserved by the control module 21 at a specific timing in advance, from a place (storage facility) where they are preserved.

Secondly, a description will be given hereinbelow of an operation of this system 10E thus configured.

The monitor agent 50 monitors the total volume (working capacity) $U_i$ of data stored in each of the storage units 20 (nodes i) and the residual available capacity $R_i$ of each of the storage units 20 (nodes i) at the present time according to any one of the aforesaid methods (ii-1) to (ii-4). In this connection, in general, the data total volume $U_i$ and the residual available capacity $R_i$ can vary every second and, in this case, it is preferable to employ a method (the aforesaid (ii-4)) in which a set of $U_i$ and $R_i$ of each of the storage units 20 is logically stored in each of the control modules 21 (or a separate unit) and the monitor agent 50 takes out the stored values in order.

In addition, the function of the decision unit 81 as the evaluation value calculating means calculates the degree of system stability (degree of system tightness) M forming the evaluation value on the basis of a set of $U_i$ and $R_i$ of each of the storage units 20 monitored by the monitor agent 50 according to the following procedures (similar to those described above in the item [6-6]).

The monitor agent 50 monitors the present value ($U_i$ and $R_i$ of each of the storage units 20) of the using state of the operating system resource, and the evaluation value calculating means of the decision unit 81 successively makes a decision as to the feasibility of the "first recovery operation", "second recovery operation" . . . , and repeatedly carries out the decision on the feasibility until the decision shows that the recovery falls into a failure. In this case, in the M-th (M=1, 2, . . . ) recovery operation feasibility decision processing, the evaluation value calculating means implements the following three-stage processing of (iii-1) search processing, (iii-2) sort processing and (iii-3) decision processing.

(iii-1) Search processing: according to this embodiment, of the plurality of storage units 20, the node i which provides the maximum value according to the aforesaid equation (36) is searched as the storage unit (tightest node) whose working capacity is the largest on the basis of the system information including the result of the monitor by the monitor agent 50.

(iii-2) Sort processing (ranking processing): the storage units 20 other than the tightest node searched in the aforesaid search processing (iii-1) are sorted according to the total capacities $T_i$ and residual capacities $R_i$ of the storage units 20 on the basis of the system information including the result of the monitor by the monitor agent 50 for extracting the M−1 high-order storage units 20 according to the total capacity $T_i$ and further for extracting the N−1 high-order (N denotes the redundancy of this system) storage units 20 according to the residual capacity $R_i$. Concretely, the nodes other than the tightest node are sorted in the order of decreasing total capacity $T_i(=R_i+U_i)$, and the (M−1) high-order nodes are marked and, following this, the remaining nodes are sorted in the order of decreasing residual capacity $R_j$, and the (N−1) high-order nodes are marked in accordance with the system redundancy N.

(iii-3) Decision processing (inequality evaluation processing): a decision on the feasibility of the M-th recovery operation is made on the basis of a result of the sorting by the sort processing (iii-2). At this time, according to this embodiment, the aforesaid inequality (57) obtained by extending and arranging the aforesaid equation (54) is evaluated to make a decision on the feasible of the M-th recovery operation through the use of this equation (57). If this inequality (57) holds, the M-th recovery operation turns out a success without fail.

Furthermore, in a case in which the decision in the decision processing on the feasibility of the M-th recovery operation shows the success of the recovery operation and the decision in the decision processing on the feasibility of the (M+1)-th recovery operation shows the failure of the recovery operation, the "M" (that is, the executable number of times of recovery operation; the boundary between the success and the failure of the recovery) is taken as the evaluation value (degree of system stability). On the basis of the evaluation value M calculated in this way, the decision unit 81 carries out the aforesaid comparison/decision and controls the notification operation of the notification means 82 as mentioned above.

As described in the first to fifth embodiments, in the distributed storage systems (systems including a plurality of storage units 20 different in maximum available total capacity from each other) 10A to 10D designed to be capable of the efficient and stable operation control, the system operates stably until immediately before reaching the vicinity of the limit state and, hence, the system manager is hardly aware of the tightness of the system capacity. On the other hand, according to the system 10E according to the sixth embodiment of the present invention, the notification is made to the system manager in accordance with the evaluation value (degree of system stability) M related to the stable operation of this system 10E, which permits solving the aforesaid problems and enables the efficient and truly stable operation of this system 10E.

In particular, according to this embodiment, a decision on the feasibility of the M-th recovery operation is made on the basis of the present system resource using situation (system information including the monitor result), and the executable number M of times of recovery operation is calculated as the degree of system stability (evaluation value). That is, according to this embodiment, in the distributed storage system 10E, on the basis of the present system resource using situation, the degree M of system stability (M denotes a non-negative integer) can be defined in a clear and concrete meaning of "the later M-th recovery operation turns out a success without fail". Moreover, the aforesaid degree M of system stability can accurately be calculated/decided only by the simple arithmetic and the comparison in magnitude.

Figure 9:
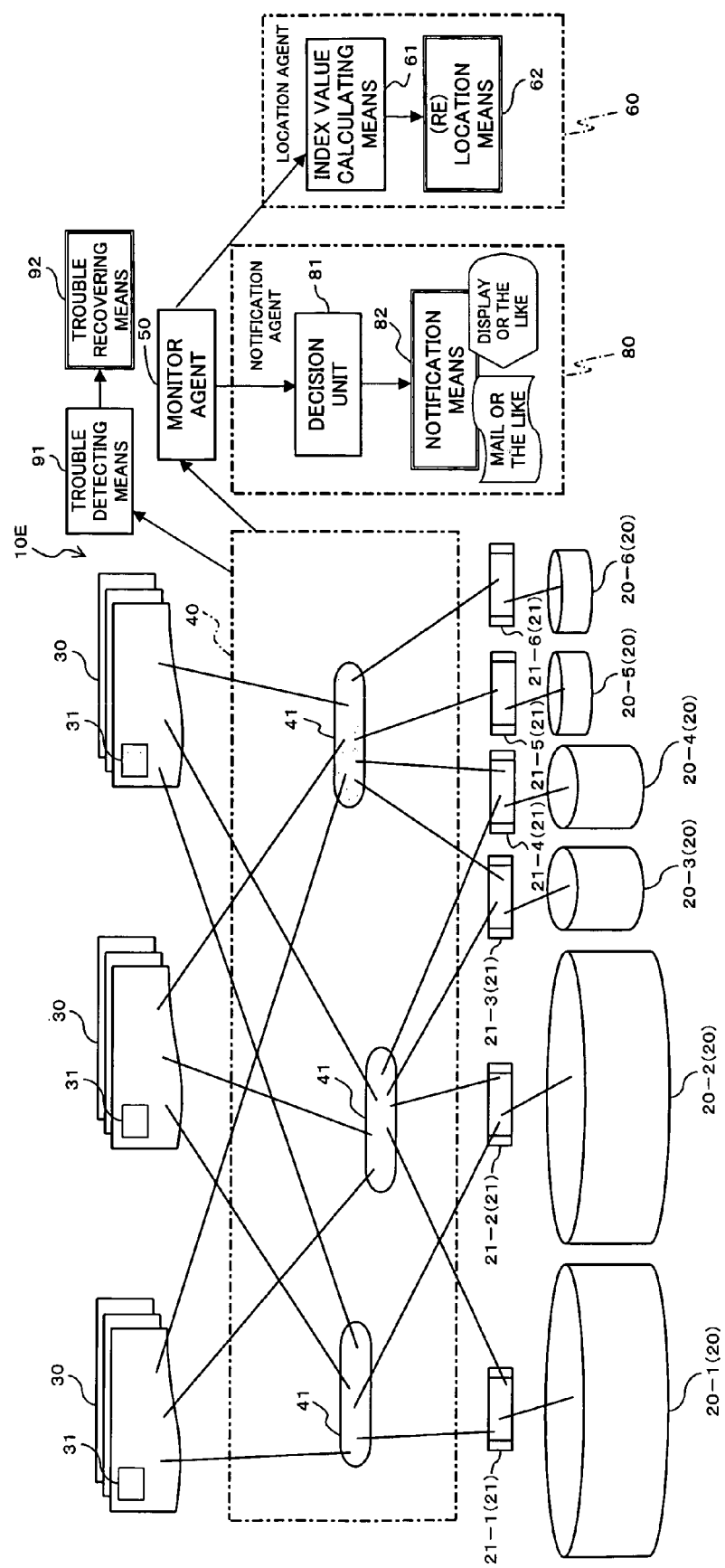
FIG. 9 is a block diagram showing a configuration of a distributed network storage system (distributed storage system) according to a modification of the sixth embodiment of the present invention.

On the other hand, FIG. 9 is a block diagram showing a modification of the configuration of a distributed network storage system (distributed storage system) according to the sixth embodiment of the present invention. As FIG. 9 shows, this modification of the sixth embodiment is also configured almost similarly to the system 10E shown in FIG. 8 except that the location agent 60 described in the first embodiment is additionally provided therein. In FIG. 9, the same reference numerals as those used above represent the same or almost same parts, and the description thereof will be omitted for brevity.

As FIG. 9 shows, in a case in which the location agent 60 is provided in the system 10E according to the sixth embodiment, as described above in the first embodiment, even if the usage rate ρ of the entire system varies under a situation in which the characteristics of the storage units 20, such as maximum available total capacity $T_i$ or speed performance, are different from each other, the efficient and stable operation control on the system 10E becomes feasible. In this system 10E, owing to the employment of the aforesaid notification agent 80, it is possible to eliminate the situation that the system operates stably until immediately before the using limit state because the system is designed to operate stably so that the system manager is hardly aware of the tightness of the system capacity, thus enabling the efficient and truly stable operation of the system 10E.

In particular, in the system 10E shown in FIG. 9, when the location agent 60 is based on the employment of the fifth method in the first embodiment, that is, as the premise, the data relocation facility based the node usage rate equalization works correctly, in searching the tightest node, the node is searched which provides the aforesaid equation (37)(that is, searching, of a plurality of nodes, the node whose working capacity (stored data volume) is the largest) and the subsequent procedure is conducted similarly to that of the sixth embodiment. In this case, the advantage is that the calculation cost for the search of the tightest node is almost zero.

In addition, in the case of a large-scale distributed storage system, in most cases, $R_t$ is extremely larger than $$\left(R_i + \sum_{j=1}^{N-1} R_j\right).$$

Also in this case, the same tightest node searching method as that of the aforesaid sixth embodiment is employable as the approximate handling, and it is possible to save the calculation cost without feeling a large anxiety about the introduction of error stemming from the approximate calculation.

In addition, according to the above-described sixth embodiment or modification thereof, the aforesaid inequality (56) more simplified than the aforesaid inequality (57) can also be used for the decision on the feasibility of the recovery operation. If this inequality (56) holds, the M-th recovery operation turns out a success without fail. In the case of the use of this inequality (56), for the decision on the feasibility of the recovery operation, the saving of the calculation cost is further feasible as compared with the sixth embodiment or the modification thereof. The feasibility decision conditional expression (56) is an equation slightly shifted in numeric in a direction of a stricter condition than a condition of the feasibility decision conditional expression (57) used in the sixth embodiment and, although the difference therebetween is small, the difference in calculation cost is not small. Therefore, the saving of the calculation cost becomes feasible without feeling a large anxiety about the introduction of decision error stemming from a very small difference in decision conditional expression.

[8] Description of Seventh Embodiment

Figure 10:
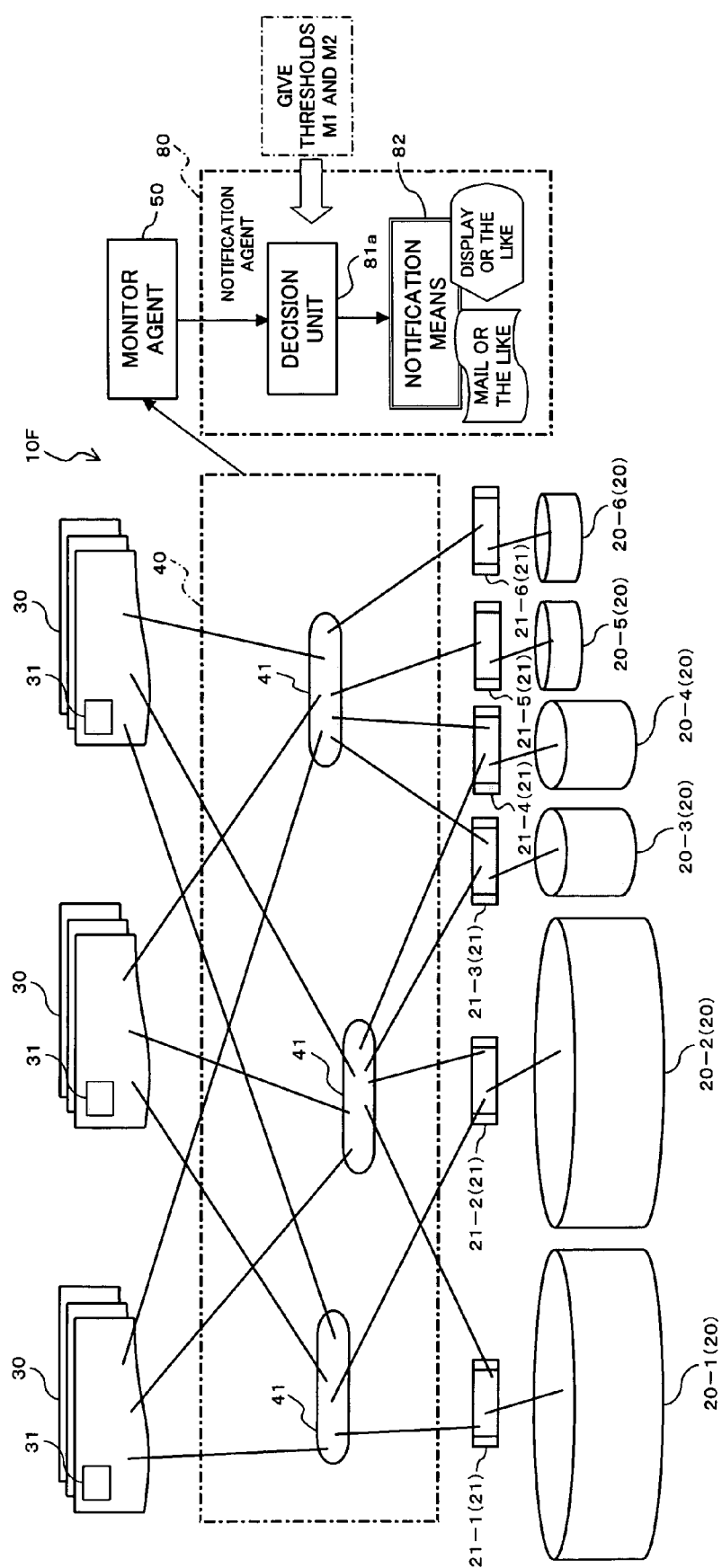
FIG. 10 is a block diagram showing a configuration of a distributed network storage system (distributed storage system) according to a seventh embodiment of the present invention.

FIG. 10 is a block diagram showing a configuration of a distributed network storage system (distributed storage system) according to a seventh embodiment of the present invention. As FIG. 10 shows, the distributed network storage system 10F according to the seventh embodiment is configured almost similarly to that of the system 10E according to the sixth embodiment except that a decision unit 81a is provided in place of the decision unit 81 of the sixth embodiment. In FIG. 10, the same reference numerals as those used above represent the same or almost same parts, and the description thereof will be omitted for brevity. Moreover, in FIG. 10, the aforesaid trouble detecting means 91 and the trouble recovering means 92 are omitted from the illustration. Still moreover, also in the system 10F shown in FIG. 10, as well as the system 10E shown in FIG. 9, it is also possible that the location agent 60 is provided therein.

In this seventh embodiment, two different types of thresholds (first threshold and second threshold) M1 and M2 are given to the decision unit 81a, and the decision unit 81a functions as comparison means (first comparison means and second comparison means) for making comparison between the calculated evaluation value (degree of system stability) and the given thresholds M1 and M2. In this embodiment, in accordance with the comparison results, the notification means 82 performs the notification operation to the system manager in a stepwise fashion.

Thus, when the degree M of system stability is equal to or smaller than (or is below) the second threshold M2 (>M1), the notification means 82 notifies this fact (the fact that the system falls into an unstable state (state close to the limit)) to the system manager. Thereafter, when the system falls into a more unstable state and the degree M of system stability is equal to or lower than (or is below) the first threshold M1, the notification means 82 notifies this fact (the fact that the system falls into a state closer to the limit) to the system manager. In a manner such that the notification is made stepwise in accordance with the degree M of system stability, the system manager can capture the situation of the system 10F stepwise and recognize the tightness of the system capacity more reliably. Incidentally, although in this embodiment the thresholds are set to be two in number to make the notification in two stages, the present invention is not limited to this, but it is also appropriate that three or more thresholds are used to make the notification to the system manager in three or more stages.

[9] Description of Eighth Embodiment

Figure 11:
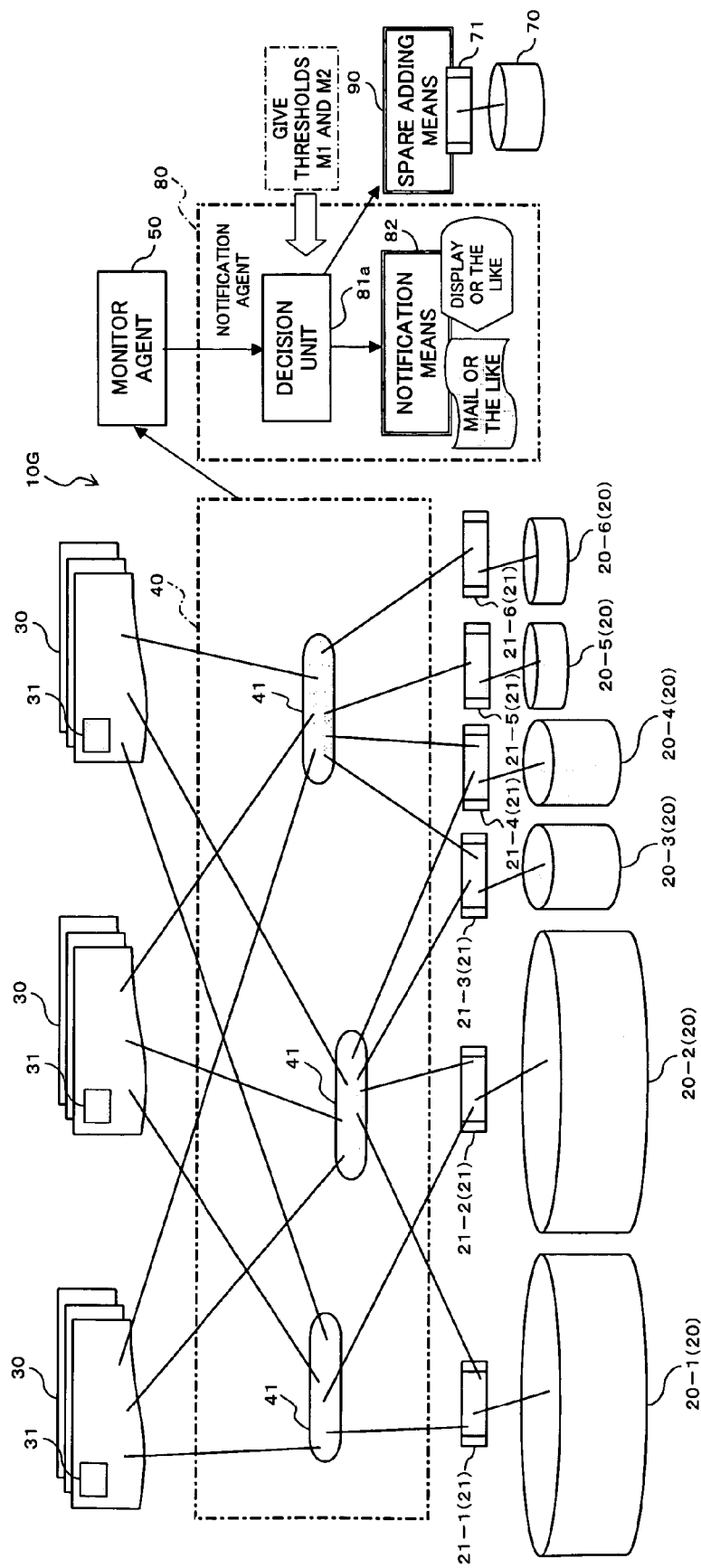
FIG. 11 is a block diagram showing a configuration of a distributed network storage system (distributed storage system) according to an eighth embodiment of the present invention.

FIG. 11 is a block diagram showing a configuration of a distributed network storage system (distributed storage system) according to an eighth embodiment of the present invention. As FIG. 11 shows, the distributed network storage system 10G according to the eighth embodiment is configured almost similarly to that of the system 10E according to the sixth embodiment except that a spare adding means 90 is additionally provided in the system 10F of the seventh embodiment. In FIG. 11, the same reference numerals as those used above represent the same or almost same parts, and the description thereof will be omitted for brevity. Moreover, in FIG. 11, the aforesaid trouble detecting means 91 and the trouble recovering means 92 are omitted from the illustration.

Still moreover, also in the system 10G shown in FIG. 11, as well as the system 10E shown in FIG. 9, it is also possible that the location agent 60 is provided therein.

The spare adding means (automatic adding means) 90 carries out a function almost similar to that of the automatic adding means 67 according to the fourth embodiment and, in this eighth embodiment, performs a function to automatically add and connect a spare storage unit 70, prepared in advance, through a control module 71 for this spare storage unit 70 to the network 40 in accordance with the degree M of system stability calculated in the decision unit 81a.

In particular, according to this embodiment, when the comparison result in the decision unit (comparison means) 81a shows that the degree M of system stability is equal to or smaller (or is below) the second threshold M2 larger than the first threshold M1, the notification means 82 first performs the notification operation (alarm operation) to the system manager and, thereafter, when the comparison result in the decision unit (comparison means) 81a shows that the degree M of system stability is equal to or lower than (or is below) the first threshold M1, the spare adding means 90 automatically add a spare storage unit 70, prepared in advance, through a control module for this spare storage unit 70 to the network 40.

Although in the above-described sixth embodiment the notification means 82 provided in the notification agent 80 notifies the calculated degree M of system stability (evaluation value) or a situation corresponding to the degree M of system stability to the system manager through the use of some means, the system manager, receiving the notification, should increase the available capacity of the entire storage system until it reaches a value reliable to the system manager. Therefore, the system manager is required to pay attention to the operational crisis notification from the storage system even in the nighttime and holiday. For this reason, according to this embodiment, in conjunction with the system operation crisis notification function of the decision unit 81a and the notification means 82 in the notification agent 80, the spare adding means 90 automatically adds/connects the spare storage unit 70, prepared in advance, to the system 10G (network 40).

From the viewpoint of only the consideration to the stable operation of the system 10G, it is considered that the "automatic adding of the previously prepared spare storage unit 70 to the system 10G at the crisis of the operation" does not create any advantage apparently, as compared with a method of "the spare storage unit 70 is previously added to the system 10G at the time that it is prepared". However, from the viewpoint of the system management and operation cost, if a storage having a large capacity which can be considered to be originally unnecessary is used at an earlier timing than a requirement timing for high stability, it is considered that economical disadvantage occurs in that there is a possibility of increasing the system management and operation cost. Therefore, in the eighth embodiment, "the automatic adding means 90 for the spare storage unit 70" can provide a solving measure with a high cost performance in terms of a high-stability operation of the distributed network storage system 10G.

[10] Description of Ninth Embodiment

Figure 12:
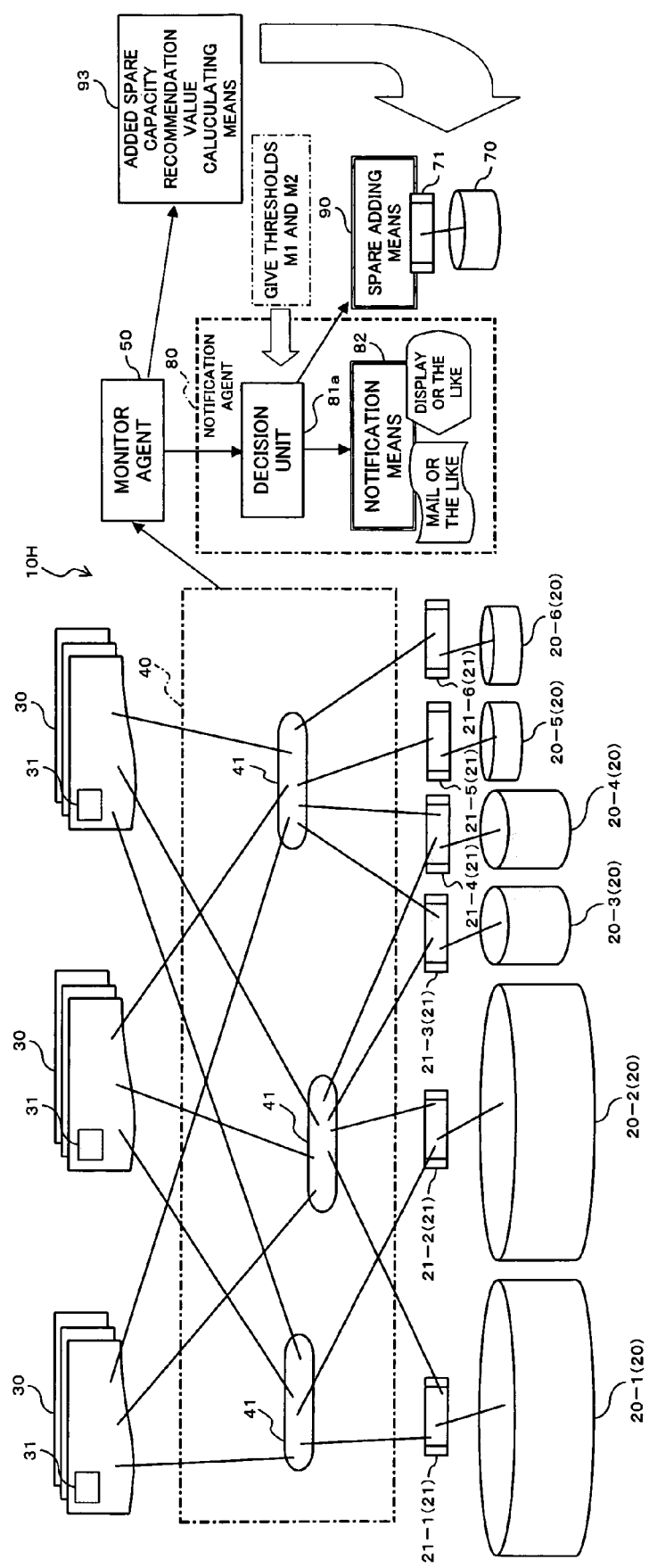
FIG. 12 is a block diagram showing a configuration of a distributed network storage system (distributed storage system) according to a ninth embodiment of the present invention.

FIG. 12 is a block diagram showing a configuration of a distributed network storage system (distributed storage system) according to a ninth embodiment of the present invention. As FIG. 12 shows, the distributed network storage system 10H according to the ninth embodiment is configured almost similarly to that of the system 10G according to the eighth embodiment except that an added spare capacity recommendation value calculating means 93 is additionally provided in the system 10G of the eighth embodiment. In FIG. 12, the same reference numerals as those used above represent the same or almost same parts, and the description thereof will be omitted for brevity. Moreover, in FIG. 12, the aforesaid trouble detecting means 91 and the trouble recovering means 92 are omitted from the illustration. Still moreover, also in the system 10H shown in FIG. 12, as well as the system 10E shown in FIG. 9, it is also possible that the location agent 60 is provided therein.

The added spare capacity recommendation value calculating means (recommendation value calculating means, estimation agent) 93 is for calculating a recommendation value on the size(s) and/or number of the storage units, prepared as the spare storage unit 70 in advance, on the basis of system information including a result of the monitor by the monitor agent 50. In particular, in this embodiment, the recommendation value calculating means 93 is made to calculate, as the aforesaid recommendation value, the size(s) and/or number of storage units so that the degree M of system stability exceeds the aforesaid second threshold M2 (or it becomes more than the second threshold M2) when spare storage unit 70 is added by the spare adding means 90. That is, the recommendation value to be calculated by the recommendation value calculating means 93 is set at a level which does not cause the operation of the notification means 82 after the addition of the spare storage unit 70.

In the above-described eighth embodiment, the spare adding means 90 automatically adds/connects the previously prepared spare storage unit 70 to the system (network 40) in response to the crisis notification occurring in accordance with a variation of the value M of the "degree of system stability". In this case, with respect to the size (s) or number of the spare storage units 70 to be prepared in advance, the value M of the "degree of system stability" is required to become a value reliable to the system manager after the automatic addition.

Therefore, in the ninth embodiment, the notification agent 80 calculates the value M of "degree of system stability" on the basis of the present resource using state obtained from the monitor agent 50 and makes a crisis notification as needed, and the recommendation value calculating unit (recommendation value calculating means, estimation agent) 93 calculates the "recommendation size (and number)" of the spare storage unit 70 which is required for improving the present "system stability degree (present value)" to a "system stability degree (set value)" providing a more stable state than present. Moreover, for example, the calculation result is displayed on a monitor screen of the system at all times to notify it to the system manager, and the system manager can surely prepare the spare storage unit(s) 70 according to the displayed "recommendation size (and number) while making reference to this display, which enabling the stable operation of this system 10H.

In this connection, as the recommendation size calculating method in the recommendation value calculating unit 93, for example, the following method is employable.

The condition for the success of the M-th recovery operation, when expressed by an equation simplified, is given by the following inequality (58) which is the same as the aforesaid inequality (56).

$$R_t \geq (R_a + U_a) + \sum_{i=1}^{M-1}(R_i + U_i) + \sum_{j=1}^{N-1} R_j \quad (58)$$

In this case, as mentioned above, N represents the redundancy coefficient of the system and the subscript a signifies the tightest node. The sum $$\sum_{i=1}^{M-1}(R_i + U_i)$$

in the aforesaid equation (58) is the sum of the high-order (M−1) nodes as the result of the sorting according to total capacity $T_i(=R_i+U_i)$.

Moreover, with respect to the remaining nodes, the sum $$\sum_{j=1}^{N-1} R_j$$

in the aforesaid equation (58) is the sum of the high-order (N−1) nodes as the result of the sorting according to residual capacity $R_j$. Let it be assumed that the node (spare storage unit 70) of Tx is added to the state expressed by the aforesaid equation (58) (that is, in this case, the subscript of the node added is set at x).

With respect to the node x, since Ux=0 at least before the relocation, there is no anxiety about the substitution for the tightest node a. In this case, according to the magnitude of the total capacity Tx (=Rx: satisfaction before the relocation), there are two cases: (a1) the node x is included in the high-order (M−1) nodes larger in total capacity and (a2) the node x is not included in the high-order (M−1) nodes larger in total capacity, and consideration is given to these two divided cases.

(a1) Case of the node x being included in the high-order (M−1) nodes larger in total capacity $$R_t + R_x \geq (R_a + U_a) + (R_x + U_x) + \sum_{i=1}^{M-2}(R_i + U_i) + \sum_{j=1}^{N-1} R_j \quad (59)$$

Considering the state before the relocation, Ux=0, and when it is replaced and the common factor Rx is subtracted from both the sides of the aforesaid equation (59), it is seen that the aforesaid equation (59) is equivalent to the following equation (60).

$$R_t \geq (R_a + U_a) + \sum_{i=1}^{M-2}(R_i + U_i) + \sum_{j=1}^{N-1} R_j \quad (60)$$

The following is found from the comparison between the aforesaid equation (60) and the aforesaid equation (58). That is, adding the node x having a sufficiently large size (the lower limit value of the size is determined in accordance with whether or not it is included in the high-order (M−1) larger in total capacity in the system) by one is equivalent to incrementing the degree M of system stability by just 1.

(a2) Case of the node x being not included in the high-order (M−1) nodes larger in total capacity If another addition node y (spare storage unit 70) is prepared so that the sum of Tx+Ty becomes as large as being included in the high-order (M−1) in total capacity, for the same reason as the aforesaid (a1) [this basis is analogized from the relationship between the aforesaid equation (55) and the aforesaid equation (28)], the degree M of system stability can be raised by just one.

From the above examination, the following is found. When the sum of storage capacities prepared as the spare storage unit 70 exceeds the total capacity of the high-order (M−1)-th node larger in total capacity in the system, the degree M of system stability is raised by just one by adding the spare storage unit 70. As easily analogized from the above, if the sum of the storage capacities prepared as the spare storage unit 70 exceeds the sum of the high-order (M−1)-th and (M−2)-th nodes larger in total capacity in the system, it is considered that the degree M of system stability is raised by just 2 by adding the spare storage unit 70. Accordingly, the methods of raising the degree M of system stability by 3, 4, 5, . . . can be considered in like manner.

[11] Others

It should be understood that the present invention is not limited to the above-described embodiments, and that it is intended to cover all changes and modifications of the embodiments of the invention herein which do not constitute departures from the spirit and scope of the invention.

For example, in each of the embodiments, the numbers of storage units 20, control modules 21, data processing unit 30, hubs 41, location agent 60 (60A, 60B, 60C), notification agent 80. spare adding means 90, spare storage unit 70 and spare storage unit control module 71 are not limited to those illustrated.

In addition, the aforesaid functions (function of all of or a portion of each means) of the index value calculating means 61, the location means 62, the stop means 63, the change means 65, the automatic adding means 67, the estimation means 68, the decision unit 81, 81a, the spare adding means 90 and the recommendation value calculating unit 93 are realizable in a manner such that a computer (including CPU, information processing unit and each terminal) executes a predetermined application program (distributed storage system control program).

This program is offered in the form of being recorded a computer-readable recording medium such as flexible disk, CD-ROM, CD-R, CD-RW, DVD or the like. In this case, the computer reads out the distributed storage system control program from this recording medium and transfers it to an internal storage unit or an external storage unit for storing and using it. Moreover, it is also possible that the program is recorded in a storage unit (recording medium) such as a magnetic disk, optical disk or magneto optical disk and is presented from the storage unit through a communication line to the computer.

In this case, the computer is the concept including hardware and OS (Operating System) and signifies the hardware operating under control of the OS. Moreover, in a case in which the OS is unnecessary and the application program operates the hardware by itself, the hardware itself corresponds to the computer. The hardware is equipped with at least a microprocessor such as CPU and means for reading out a computer program recorded in a recording medium. The application program serving as the aforesaid distributed storage system control program includes program codes for realizing the functions as the index value calculating means 61, the location means 62, the stop means 63, the change means 65, the automatic adding means 67, the estimation means 68, the decision unit 81, 81a, the spare adding means 90 and the recommendation value calculating unit 93. Moreover, it is also acceptable that a portion of these functions can be realized by the OS.

Still additionally, as the recording medium in this embodiment, in addition to the above-mentioned flexible disk, CD-ROM, CD-R, CD-RW, DVD, magnetic disk, optical disk and magneto optical disk, various types of computer-readable media are employable, such as an IC card, a ROM cartridge, a magnetic tape, a punch card, an internal storage unit (memory such as RAM or ROM) of the computer, an external storage unit and a printed matter on which a code such as a bar code is printed.

What is claimed is:

1. A distributed storage system communicatively connected to at least one data processing unit, comprising:
a plurality of storage units made to store data and including a storage unit different in maximum available total capacity from the others;
control modules each connected to each of said storage units for controlling access to each of said storage units;
association means for associating logical storage areas, from/in which data is to be read/written by the data processing unit, with physical storage areas on said storage units;
monitor means for monitoring information related to a total volume of data stored in each of said storage units or in all said storage units;
index value calculating means for calculating an index value for each of said storage units on the basis of the information related to said total volume monitored by said monitor means; and
location means for distributively locating or relocating said logical storage areas in said physical storage areas on said plurality of storage units through said control modules on the basis of said index values calculated by said index value calculating means to carry out distributive location/relocation processing according to the information related to said total volume,
wherein said monitor means monitors a usage rate of the entire storage system, which is a ratio of said total volume of data stored in all said storage units or a stored data volume in each of said logical storage areas on all said storage units to a maximum available total capacity of all said storage units,
said index value calculating means calculates said index values on the basis of said usage rate of the entire storage system monitored by said monitor means,
said location means carries out distributive location/relocation of the logical storage areas to equalize said index values calculated by said index value calculating means, and
wherein said index value calculating means calculates, as each of said index values, a difference between a value obtained by multiplying the maximum available total capacity of each of said storage units by, as a weight, the usage rate of the entire storage system monitored by said monitor means and a total volume of data stored in each of said storage units or a stored data volume in each of said logical storage areas on each of said storage units, said total volume or said stored data volume being monitored by said monitor means.

2. The distributed storage system according to claim 1, wherein, when said usage rate of the entire storage system monitored by said monitor means is lower than a first predetermined value, said index value calculating means acquires, as each of said index values, a total volume (working capacity) of data stored in each of said storage units or a stored data volume (working capacity) in each of said logical storage areas on each of said storage units from said monitor means.

3. The distributed storage system according to claim 1, wherein, when said usage rate of the entire storage system monitored by said monitor means is higher than a second predetermined value, said index value calculating means calculates, as each of said index values, a difference (residual capacity) between the maximum available total capacity of each of said storage units and a total volume of data stored in each of said storage units on the basis of a result of the monitor by said monitor means.

4. The distributed storage system according to claim 1, wherein said index value calculating means calculates, as each of said index values, a difference between a ratio of a total volume of data stored in each of said storage units or a stored data volume in each of said logical storage areas on each of said storage units, said total volume or said stored data volume being monitored by said monitor means to the maximum available total capacity of each of said storage units and the usage rate of the entire storage system monitored by said monitor means.

5. The distributed storage system according to claim 1, wherein said plurality of storage units are classified into a plurality of classes whose service attributes are set in advance, and an attribute required for data to be read/written by said data processing unit is set in said data in advance, and
said location means determines a service attribute according to the required attribute of data to be distributively located/relocated, and carries out distributive location/relocation of said data in said physical storage areas on said storage units pertaining to the class in which the determined service attribute is set.

6. The distributed storage system according to claim 5, wherein said service attribute is based on a performance of each of said storage units.

7. The distributed storage system according to claim 1, wherein an attribute required for data to be read/written by said data processing unit is set in said data in advance, and
said location means determines an index value calculation method according to the required attribute of data to be distributively located/relocated by said location means, and calculates said index values through the use of the determined index value calculation method.

8. The distributed storage system according to claim 1, further comprising notification means for, when the usage rate of the entire storage system, which is a ratio of a total volume of data stored in all said storage units or a stored data volume in each of said logical storage areas on all said storage units to the maximum available total capacity of all said storage units and is monitored by said monitor means, exceeds a level set in advance, notifying this fact to a system manager.

9. The distributed storage system according to claim 1, further comprising estimation means for estimating a usage rate near-future value on the basis of a history of the usage rate of the entire storage system which is a ratio of a total volume of data stored in all said storage units or a stored data volume in each of said logical storage areas on all said storage units to the maximum available total capacity of all said storage units and is monitored by said monitor means; and notification means for, when said near-future value estimated by said estimation means exceeds a level set in advance, notifying this fact to a system manager.

10. The distributed storage system according to claim 1, further comprising means for, when the usage rate of the entire storage system, which is a ratio of a total volume of data stored in all said storage units or a stored data volume in each of said logical storage areas on all said storage units to the maximum available total capacity of all said storage units and is monitored by said monitor means, exceeds a level set in advance, automatically adding a spare storage unit, prepared in advance, through a control module for said spare storage unit.

11. The distributed storage system according to claim 1, further comprising estimation means for estimating a usage rate near-future value on the basis of a history of the usage rate of the entire storage system which is a ratio of a total volume of data stored in all said storage units or a stored data volume in each of said logical storage areas on all said storage units to the maximum available total capacity of all said storage units and is monitored by said monitor means; and means for, when said near-future value estimated by said estimation means exceeds a level set in advance, automatically adding a spare storage unit, prepared in advance, through a control module for said spare storage unit.

12. The distributed storage system according to claim 1, wherein said index value calculating means is mounted in at least one of said control modules, said data processing unit, an independent dedicated module, a system control module and a communication unit provided on a communication line for making connections between said data processing unit and said control modules so that they are mutually communicable.

13. The distributed storage system according to claim 1, wherein said location means is mounted in at least one of said control modules, said data processing unit, an independent dedicated module, a system control module and a communication unit provided on a communication line for making connections between said data processing unit and said control modules so that they are mutually communicable.

14. The distributed storage system according to claim 1, wherein a plurality of pairs of said index value calculating means and said location means are mounted so that said plurality of pairs independently carry out an index value calculation function and a distributive location/relocation function.

15. A distributed storage system communicatively connected to at least one data processing unit, comprising:
a plurality of storage units made to store data and including a storage unit different in maximum available total capacity from the others;
control modules each connected to each of said storage units for controlling access to each of said storage units;
association means for associating logical storage areas, from/in which data is to be read/written by the data processing unit, with physical storage areas on said storage units;
monitor means for monitoring information related to a total volume of data stored in each of said storage units or in all said storage units;
index value calculating means for calculating an index value for each of said storage units on the basis of the information related to said total volume monitored by said monitor means; and
location means for distributively locating or relocating said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, and said location means carries out distributive location/relocation of the logical storage areas to equalize said index values calculated by said index value calculating means, wherein said index value calculating means calculates, as each of said index values, a difference between a value obtained by multiplying the maximum available total capacity of each of said storage units by a value obtained as a weight by raising the usage rate of the entire storage system monitored by said monitor means to the M-th power (M>1) and a total volume of data stored in each of said storage units or a stored data volume in each of said logical storage areas on each of said storage units, said total volume or said stored data volume being monitored by said monitor means.

16. The distributed storage system according to claim 15, wherein said plurality of storage units are classified into a plurality of classes whose service attributes are set in advance, and an attribute required for data to be read/written by said data processing unit is set in said data in advance, and said location means determines a service attribute according to the required attribute of data to be distributively located/relocated, and carries out distributive location/relocation of said data in said physical storage areas on said storage units pertaining to the class in which the determined service attribute is set.

17. A distributed storage system communicatively connected to at least one data processing unit, comprising:

a plurality of storage units made to store data and including a storage unit different in maximum available total capacity from the others;

control modules each connected to each of said storage units for controlling access to each of said storage units;

association means for associating logical storage areas, from/in which data is to be read/written by the data processing unit, with physical storage areas on said storage units;

monitor means for monitoring information related to a total volume of data stored in each of said storage units or in all said storage units;

index value calculating means for calculating an index value for each of said storage units on the basis of the information related to said total volume monitored by said monitor means; and location means for distributively locating or relocating said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, said location means carries out distributive location/relocation of the logical storage areas to equalize said index values calculated by said index value calculating means, and wherein said index value calculating means calculates, as each of said index values, a difference between a value obtained by multiplying the maximum available total capacity of each of said storage units by, as a weight, the M-th root (M>1) of the usage rate of the entire storage system monitored by said monitor means and a total volume of data stored in each of said storage units or a stored data volume in each of said logical storage areas on each of said storage units, said total volume or said stored data volume being monitored by said monitor means.

18. The distributed storage system according to claim 17, wherein said plurality of storage units are classified into a plurality of classes whose service attributes are set in advance, and an attribute required for data to be read/written by said data processing unit is set in said data in advance, and said location means determines a service attribute according to the required attribute of data to be distributively located/relocated, and carries out distributive location/relocation of said data in said physical storage areas on said storage units pertaining to the class in which the determined service attribute is set.

19. A distributed storage system communicatively connected to at least one data processing unit, comprising:

a plurality of storage units made to store data and including a storage unit different in maximum available total capacity from the others;

control modules each connected to each of said storage units for controlling access to each of said storage units;

association means for associating logical storage areas, from/in which data is to be read/written by the data processing unit, with physical storage areas on said storage units;

monitor means for monitoring information related to a total volume of data stored in each of said storage units or in all said storage units;

index value calculating means for calculating an index value for each of said storage units on the basis of the information related to said total volume monitored by said monitor means; and location means for distributively locating or relocating said logical storage areas in said physical storage areas on said plurality of storage units through said control modules on the basis of said index values calculated by said index value calculating means to carry out distributive location/relocation processing according to the information related to said total volume, wherein said index value calculating means calculates, as each of said index values, a difference between a ratio of said total volume of data stored in each of said storage units or a stored data volume in each of said logical storage areas on each of said storage units to a total volume of data stored in all said storage units or a stored data volume in each of said logical storage areas on all said storage units, said total volume or said stored data volume being monitored by said monitor means, and a ratio of the maximum available total capacity of each of said storage units to the maximum available total capacity of all said storage units, and said location means carries out distributive location/relocation of said logical storage areas so that said index values calculated in said index value calculating means approaches zero.

20. The distributed storage system according to claim 19, wherein said plurality of storage units are classified into a plurality of classes whose service attributes are set in advance, and an attribute required for data to be read/written by said data processing unit is set in said data in advance, and said location means determines a service attribute according to the required attribute of data to be distributively located/relocated, and carries out distributive location/relocation of said data in said physical storage areas on said storage units pertaining to the class in which the determined service attribute is set.

21. A method for controlling an operation of a distributed storage system communicatively connected to at least one data processing unit, comprising:

storing data in a plurality of storage units including a storage unit different in maximum available total capacity from the others;

controlling access to each of said storage units through control modules each connected to each of said storage units;

associating, using associating means, logical storage areas, from/in which data is to be read/written by the data processing unit, with physical storage areas on said storage units;

monitoring, using monitor means, information related to a total volume of data stored in each of said storage units or in all said storage units;

calculating, using index value calculating means, an index value for each of said storage units on the basis of the information related to said total volume monitored by said monitor means; and distributively locating or relocating, using location means, said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, said location means carries out distributive location/relocation of the logical storage areas to equalize said index values calculated by said index value calculating means, and wherein said index value calculating means calculates, as each of said index values, a difference between a value obtained by multiplying the maximum available total capacity of each of said storage units by, as a weight, the usage rate of the entire storage system monitored by said monitor means and a total volume of data stored in each of said storage units or a stored data volume in each of said logical storage areas on each of said storage units, said total volume or said stored data volume being monitored by said monitor means.

22. A method for controlling an operation of a distributed storage system communicatively connected to at least one data processing unit, comprising:

storing data in a plurality of storage units including a storage unit different in maximum available total capacity from the others;

controlling access to each of said storage units through control modules each connected to each of said storage units;

associating, using associating means, logical storage areas, from/in which data is to be read/written by the data processing unit, with physical storage areas on said storage units;

monitoring, using monitor means, information related to a total volume of data stored in each of said storage units or in all said storage units;

calculating, using index value calculating means, an index value for each of said storage units on the basis of the information related to said total volume monitored by said monitor means; and distributively locating or relocating, using location means, said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, said location means carries out distributive location/relocation of the logical storage areas to equalize said index values calculated by said index value calculating means, wherein said index value calculating means calculates, as each of said index values, a difference between a value obtained by multiplying the maximum available total capacity of each of said storage units by a value obtained as a weight by raising the usage rate of the entire storage system monitored by said monitor means to the M-th power (M>1) and a total volume of data stored in each of said storage units or a stored data volume in each of said logical storage areas on each of said storage units, said total volume or said stored data volume being monitored by said monitor means.

23. A method for controlling an operation of a distributed storage system communicatively connected to at least one data processing unit, comprising:

storing data in a plurality of storage units including a storage unit different in maximum available total capacity from the others;

controlling access to each of said storage units through control modules each connected to each of said storage units;

associating, using associating means, logical storage areas, from/in which data is to be read/written by the data processing unit, with physical storage areas on said storage units;

monitoring, using monitor means, information related to a total volume of data stored in each of said storage units or in all said storage units;

calculating, using index value calculating means, an index value for each of said storage units on the basis of the information related to said total volume monitored by said monitor means; and distributively locating or relocating, using location means, said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, said location means carries out distributive location/relocation of the logical storage areas to equalize said index values calculated by said index value calculating means, and wherein said index value calculating means calculates, as each of said index values, a difference between a value obtained by multiplying the maximum available total capacity of each of said storage units by, as a weight, the M-th root (M>1) of the usage rate of the entire storage system monitored by said monitor means and a total volume of data stored in each of said storage units or a stored data volume in each of said logical storage areas on each of said storage units, said total volume or said stored data volume being monitored by said monitor means.

24. A method for controlling an operation of a distributed storage system communicatively connected to at least one data processing unit, comprising:

storing data in a plurality of storage units including a storage unit different in maximum available total capacity from the others;

controlling access to each of said storage units through control modules each connected to each of said storage units;

associating, using associating means, logical storage areas, from/in which data is to be read/written by the data processing unit, with physical storage areas on said storage units;

monitoring, using monitor means, information related to a total volume of data stored in each of said storage units or in all said storage units;

calculating, using index value calculating means, an index value for each of said storage units on the basis of the information related to said total volume monitored by said monitor means; and distributively locating or relocating, using location means, said logical storage areas in said physical storage areas on said plurality of storage units through said control modules on the basis of said index values calculated by said index value calculating means to carry out distributive location/relocation processing according to the information related to said total volume, wherein said monitor means monitors a usage rate of the entire storage system, which is a ratio of said total volume of data stored in all said storage units or a stored data volume in each of said logical storage areas on all said storage units to a maximum available total capacity of all said storage units, said index value calculating means calculates said index values on the basis of said usage rate of the entire storage system monitored by said monitor means, said location means carries out distributive location/relocation of the logical storage areas to equalize said index values calculated by said index value calculating means, and wherein said index value calculating means calculates, as each of said index values, a difference between a ratio of said total volume of data stored in each of said storage units or a stored data volume in each of said logical storage areas on each of said storage units to a total volume of data stored in all said storage units or a stored data volume in each of said logical storage areas on all said storage units, said total volume or said stored data volume being monitored by said monitor means, and a ratio of the maximum available total capacity of each of said storage units to the maximum available total capacity of all said storage units, and said location means carries out distributive location/relocation of said logical storage areas so that said index values calculated in said index value calculating means approaches zero.

* * * * *